US008724865B2

(12) United States Patent
Hipp et al.

(10) Patent No.: US 8,724,865 B2
(45) Date of Patent: May 13, 2014

(54) METHOD, COMPUTER SOFTWARE, AND SYSTEM FOR TRACKING, STABILIZING, AND REPORTING MOTION BETWEEN VERTEBRAE

(75) Inventors: John A. Hipp, Manvel, TX (US);
Nicholas Wharton, Houston, TX (US);
James M. Ziegler, Houston, TX (US);
Mark L. Lamp, Houston, TX (US)

(73) Assignee: Medical Metrics, Inc., Houston, TX (US)

( * ) Notice: Subject to any disclaimer, the term of this patent is extended or adjusted under 35 U.S.C. 154(b) by 1048 days.

(21) Appl. No.: 12/469,892

(22) Filed: May 21, 2009

(65) Prior Publication Data

US 2009/0285466 A1    Nov. 19, 2009

Related U.S. Application Data

(63) Continuation-in-part of application No. 10/289,895, filed on Nov. 7, 2002, now abandoned.

(60) Provisional application No. 60/339,569, filed on Nov. 7, 2001, provisional application No. 60/354,958, filed on Nov. 7, 2001.

(51) Int. Cl.
*G06K 9/00*    (2006.01)
*G06K 9/32*    (2006.01)

(52) U.S. Cl.
USPC ............................ 382/128; 382/294; 600/415

(58) Field of Classification Search
CPC ............................................ G06T 2207/30012
USPC ........................... 382/218, 128, 294; 600/415
See application file for complete search history.

(56) References Cited

U.S. PATENT DOCUMENTS

| 4,495,491 | A | * | 1/1985 | Postl ............................. 345/157 |
| 5,509,042 | A | | 4/1996 | Mazess |
| 5,582,186 | A | | 12/1996 | Weigand |
| 5,590,271 | A | * | 12/1996 | Klinker ......................... 715/763 |
| 5,673,298 | A | * | 9/1997 | Mazess ........................... 378/54 |
| 5,740,267 | A | * | 4/1998 | Echerer et al. ................ 382/132 |
| 6,002,959 | A | | 12/1999 | Steiger et al. |
| 6,434,264 | B1 | * | 8/2002 | Asar ............................. 382/147 |
| 6,571,021 | B1 | * | 5/2003 | Braudaway ................... 382/275 |
| 6,608,916 | B1 | | 8/2003 | Wei et al. |

(Continued)

OTHER PUBLICATIONS

Dvorak et al, "In Vivo Flexion/Extiension of the Normal Cervical Spine", 1991, Raven Press, Journal of Othopaedic Research, 828-834.*

(Continued)

*Primary Examiner* — Kathleen Y Dulaney
(74) *Attorney, Agent, or Firm* — Haynes and Boone, LLP

(57) ABSTRACT

A method computer program for displaying relative movement between vertebrae or other medical objects is provided. The method generally includes acquiring at least two images of adjacent vertebrae, wherein the at least two images are acquired from a substantially similar acquisition position and illustrate the vertebrae in two different positions. The method further includes displaying a first image to a user on a screen, displaying a second image to the user overlaid onto the first image, translating, via user input, the first or second image to align a stationary feature present in both the first and second images, and alternately displaying the translated first and second images to display relative movement between the stationary feature and adjacent features.

40 Claims, 15 Drawing Sheets

(56) References Cited

U.S. PATENT DOCUMENTS

| | | | |
|---|---|---|---|
| 6,901,280 B2* | 5/2005 | Pelletier et al. | 600/410 |
| 6,937,751 B2* | 8/2005 | Ritt et al. | 382/132 |
| 7,050,622 B2* | 5/2006 | Morishima et al. | 382/148 |
| 7,184,814 B2* | 2/2007 | Lang et al. | 600/416 |
| 7,257,245 B2* | 8/2007 | Oosawa | 382/132 |
| 7,307,643 B2* | 12/2007 | Moroo et al. | 345/667 |
| 2003/0026469 A1* | 2/2003 | Kreang-Arekul et al. | 382/132 |
| 2003/0081837 A1* | 5/2003 | Williame et al. | 382/215 |
| 2004/0037468 A1* | 2/2004 | Morishima et al. | 382/218 |
| 2006/0093198 A1* | 5/2006 | Fram et al. | 382/128 |
| 2009/0087046 A1* | 4/2009 | Kuhn | 382/128 |

OTHER PUBLICATIONS

Presentation to the Graduating Class of the Dept. of Orthopedic Surgery on Research at Baylor College of Medicine, Dr. Lane Spero, Jun. 1989.

* cited by examiner

| Database | Acquire | Review | Track | Report |

| New Patient | Edit Patient | Delete Patient | Search | Refresh |

| Patient | ID | DOB | Sex |
|---|---|---|---|
| Cervical, Spine | 75006562 | | |
| CervicalSpine, Anterior | 75007706 | 4/5/1967 | |
| CervicalSpine, Anterior | 75008630 | 11/28/2001 | |
| CervicalSpine, Demo | 75008342 | 11/28/2001 | Female |
| CervicalSpine, DemoN | 555 | 2/11/2002 | Male |
| Digital X-Ray, CSpine | 950196138 | 12/22/1961 | M |
| Knee, KT-1000 | 75007138 | | Male |
| Knee | 75008549 | 4/5/1957 | Male |
| LumbarSpine, Demo | 75008435 | 11/28/2001 | |
| LumbarSpine, LaPat | 32202 | 3/17/1986 | Female |
| Spine, Cervical | 75007616 | 4/5/1957 | Male |
| Validation, Phase I | 0000 | 3/6/2002 | |

| Study Type | View | Date | Time |
|---|---|---|---|
| Cervical Spine | LabMed -FlexionExt | 11/28/2001 | 2:14:10 PM |

| Edit Study | Delete Study | Open Study | New Study | Physician |

Snake Initialization

Found Contour

Before Masking

After Masking

Intervertebral Motion Analysis Report
(For Investigational Use Only)
*Patient Information*
Name: Spine, Patient    ID: 000000001    DOB:07-06-1941 Sex: F
*Study Information*
Type: LSPINE    Date: 05-14-2002    Physician:Spine, Doctor MD
*Methods:* METHODS TEXT
*Results:* RESULTS TEXT
Neutral
Quantitative Results
L3-L4
|  | Flexion | Extension |
|---|---|---|
| Ant Disp (mm) | -1.3 | 0.1 |
| Post Disp (mm) | -0.9 | -0.1 |
| Shear (mm) | 1.2 | -0.0 |
| Rotation (deg) | -1.2 | 0.2 |
Flexion
Extension
Fig. 17

METHOD, COMPUTER SOFTWARE, AND SYSTEM FOR TRACKING, STABILIZING, AND REPORTING MOTION BETWEEN VERTEBRAE

This application is a continuation in part application of U.S. patent application Ser. No. 10/289,895, filed on Nov. 7, 2002, which claims priority to provisional application Ser. No. 60/339,569, filed Nov. 7, 2001, and provisional application Ser. No. 60/354,958, filed Nov. 7, 2001, assigned to the assignee of the present application and incorporated herein by reference in their entirety.

BACKGROUND

The present embodiments relate to clinical assessment of spinal stability, and more particularly, to a method and system for tracking, stabilizing, and reporting motion between vertebrae.

One of the primary functions of the spine is to protect the spinal cord and associated neural elements, as well as, mechanically support the upper body so that a person can perform the desired activities of daily living. When these mechanical functions are compromised by trauma, disease, or aging, the individual can experience pain and other symptoms. Millions of people suffer from disorders of their spine. Back disorders are a leading cause that prevents individuals from working productively in society. As part of the diagnosis and treatment of these individuals, clinicians need to know if the motion in the spine is abnormal.

The spine consists of 26 bones call vertebrae. Vertebrae are normally connected to each other by a complex arrangement of ligaments. A large number of muscles also attach to these vertebrae and create motion required by the individual. Vertebrae have complex geometries and are separated from each other by a structure called the intervertebral disc. Several research studies have shown that if vertebrae are fractured, if ligaments between vertebrae are damaged, or the intervertebral disc between vertebrae is damaged, then the motion between the vertebrae can be altered. When diagnosing and treating a patient with a spinal disorders clinicians need to know if motion between vertebrae is abnormal or not, since any abnormalities in motion can help the clinician understand what part of the spine has been damaged.

Clinicians use physical tests and imaging studies to determine if motion in the spine is abnormal. The ability to correctly identify abnormalities in motion (the sensitivity), and the ability to correctly determine that there is no abnormality (the specificity) of most common clinical tests are either not known, or have been shown by scientific studies to be unreliable or inaccurate in many patients. One of the most common clinical imaging studies used to assess motion in the spine is simple radiographs. In some cases, the clinician compares radiographs taken with the person in two or more different positions, to assess motion in the spine. A single static image can show if there is any misalignment of the spine, but the single image cannot be used to determine if there is abnormal motion in the spine. Comparing radiographs taken of the patient in two or more positions can be difficult and scientific studies have shown this technique to have significant limitations.

To be of clinical value, a diagnostic test must be reliable, easy to interpret, and ideally should be non-invasive and relatively fast. Currently, the most accurate method for measuring motion between vertebrae in living subjects, is to surgically implant metal markers into the vertebrae. The technique is commonly referred to as Roentgen Stereophotogrammetric Analysis (RSA). With RSA, radiographic images are obtained with the patient in two or more different positions. The radiographic images must be taken with the patient located within a geometric calibration frame that allows the spatial coordinates of the images to be calculated. The position of the metal markers can then be measured and compared between images. Radiographs are also usually taken in two different planes, allowing for three-dimensional motion measurements. Although this method can be accurate, it is invasive because it requires surgical implantation of markers. In addition, it is time consuming to analyze the image to measure motion of the markers. Although, this method has been used in laboratory and clinical research studies, it is not known to be used in routine clinical practice.

Another method that has been used to measure motion between vertebrae in the spine involves combining geometric information obtained from a computed tomography (CT) study of the spine with information from a fluoroscopic imaging study of the spine. By knowing the actual three-dimensional geometry of an object, it is possible to estimate two-dimensional motion from fluoroscopic imaging data. Although this method is non-invasive, it does require a CT examination and substantial post-processing of the data. It is not a method that could be readily used in routine clinical practice. However, this method has been used in several published laboratory studies, mostly related to motion around total joint replacements.

Accordingly, a reliable and accurate method to assess motion in the spine that can be used in clinical practice for overcoming the problems in the art is desired. Such a method could also be useful in research studies to develop better methods for diagnosing and treating patients with spinal disorders.

SUMMARY

According to one embodiment of the present disclosure, a method for processing medical images via an information handling system identifies and tracks motion between vertebrae of a spine. The method includes identifying one or more vertebra in each of at least two medical images accessed via the information handling system, and acquiring tracking data as a function of a position of the respective identified vertebrae from the at least two medical images. The method also includes processing a sequence of the at least two medical images as a function of the tracking data to track a motion between the vertebrae of the spine in the sequence.

BRIEF DESCRIPTION OF THE DRAWINGS

The present disclosure is best understood from the following detailed description when read in conjunction the accompanying Figures. It is to be noted, however, that the accompanying Figures illustrate only exemplary embodiments of the invention and are therefore not to be considered limiting of its scope, for the invention may admit to other equally effective embodiments.

FIG. 3 is a graphical user interface view of an example interface configured to enable a user to select sequences of medical images for the purposes of tracking or visualizing motion between vertebrae according to another embodiment of the present disclosure;

FIG. 17 is an illustrative view of a report according to one embodiment of the present disclosure.

DETAILED DESCRIPTION

Figure 1:
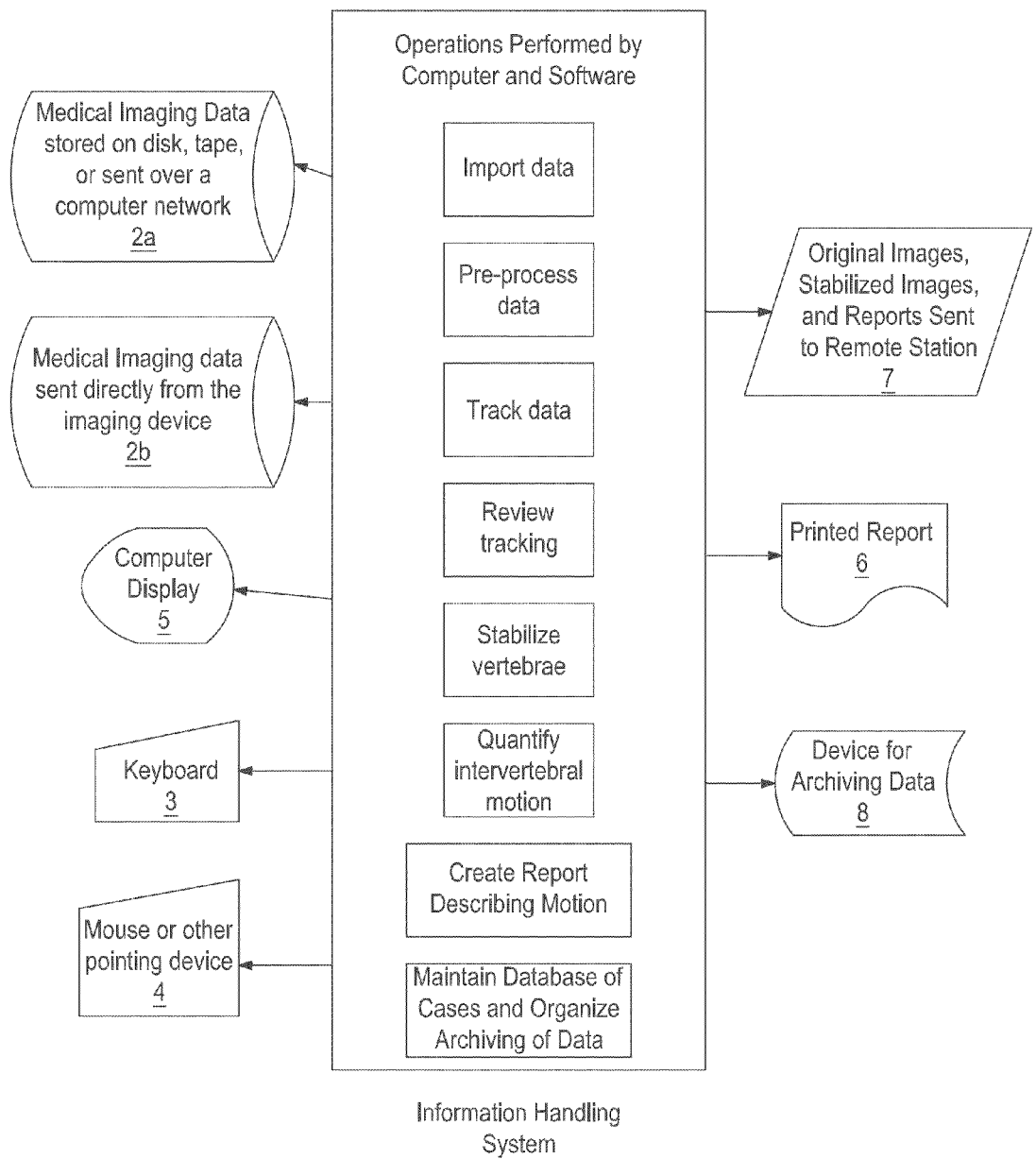
FIG. 1 is a functional block diagram view of an information handling system configured to measure and display intervertebral motion in the spine according to one embodiment of the present disclosure.

It is to be understood that the following disclosure describes several exemplary embodiments of the invention, along with exemplary methods for implementing or practicing the invention. Therefore, the following disclosure describes exemplary components, arrangements, and configurations that are intended to simplify the present disclosure. These exemplary embodiments are merely examples of various possible configurations and implementations of the invention and are not intended to be limiting upon the scope of the invention in any way. Further, the present disclosure may repeat reference numerals and/or letters in the various exemplary embodiments and across multiple Figures. Applicants note that this repetition is for the purpose of simplicity and clarity and does not in itself dictate a relationship between the various exemplary embodiments and or configurations discussed herein. Additionally, where the following disclosure describes structural relationships between the elements of a particular embodiment, the particular structural relationship described is not intended to be limiting upon the scope of the invention, as the inventors contemplate that various components may be interstitially positioned without departing from the true scope of the invention. Similarly, where method steps are described, unless expressly stated herein, the invention is not intended to be limited to any particular sequence of the method steps described. Further, the invention is not intended to be limited only to the method steps described, as various additional steps may be implemented in addition to the described method steps without departing from the true scope of the invention.

Additionally, in various embodiments, the invention may provide advantages over the prior art; however, although embodiments of the invention may achieve advantages over other possible solutions and the prior art, whether a particular advantage is achieved by a given embodiment is not intended in any way to limit the scope of the invention. Thus, the following aspects, features, embodiments, and advantages are intended to be merely illustrative of the invention and are not considered elements or limitations of the appended claims; except where explicitly recited in a claim. Similarly, references to "the invention" herein should neither be construed as a generalization of any inventive subject matter disclosed herein nor considered an element or limitation of the appended claims, except where explicitly recited in a claim.

Further, at least one embodiment of the invention may be implemented as a program product for use with a computer system or processor. The program product may define functions of the exemplary embodiments (which may include methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., computer disks for use with a disk drive or hard-disk drive, writable CD-ROM disks and DVD disks, zip disks, portable memory devices, and any other device configured to store digital data); and (iii) information conveyed across communications media, (e.g., a computer, telephone, wired network or wireless network). These embodiments may include information shared over the Internet or other computer networks. Such computer readable media, when carrying computer-readable instructions that perform methods of the invention, may represent embodiments of the present invention.

Further still, in general, software routines or modules that implement embodiments of the invention may be part of an operating system or part of a specific application, component program, module, object, or sequence of instructions, such as an executable script. Such software routines typically include a plurality of instructions capable of being performed using a computer system or other type or processor configured to execute instructions from a computer readable medium. Also, programs typically include or interface with variables, data structures, etc., that reside in a memory or on storage devices as part of their operation. In addition, various programs described herein may be identified based upon the application for which they are implemented. Those skilled in the art will readily recognize, however, that any particular nomenclature or specific application that follows facilitates a description of the invention and does not limit the invention for use solely with a specific application or nomenclature. Furthermore, the functionality of programs described herein may use a combination of discrete modules or components interacting with one another. Those skilled in the art will recognize, however, that different embodiments may combine or merge such components and modules in a variety of ways.

The present embodiments provide assistance to system users in measuring and visualizing motion between vertebrae in the spine. In one embodiment, the method is implemented via an information handling system. The information handling system can include one or more of a computer system 1 running appropriate software (as further described herein), data input devices 2a-b, a keyboard 3, a pointing device or tool 4, a display 5, and output devices such as printers 6, a computer network 7, and disk or tape drives 8, as shown, for example in FIG. 1.

Figure 2:
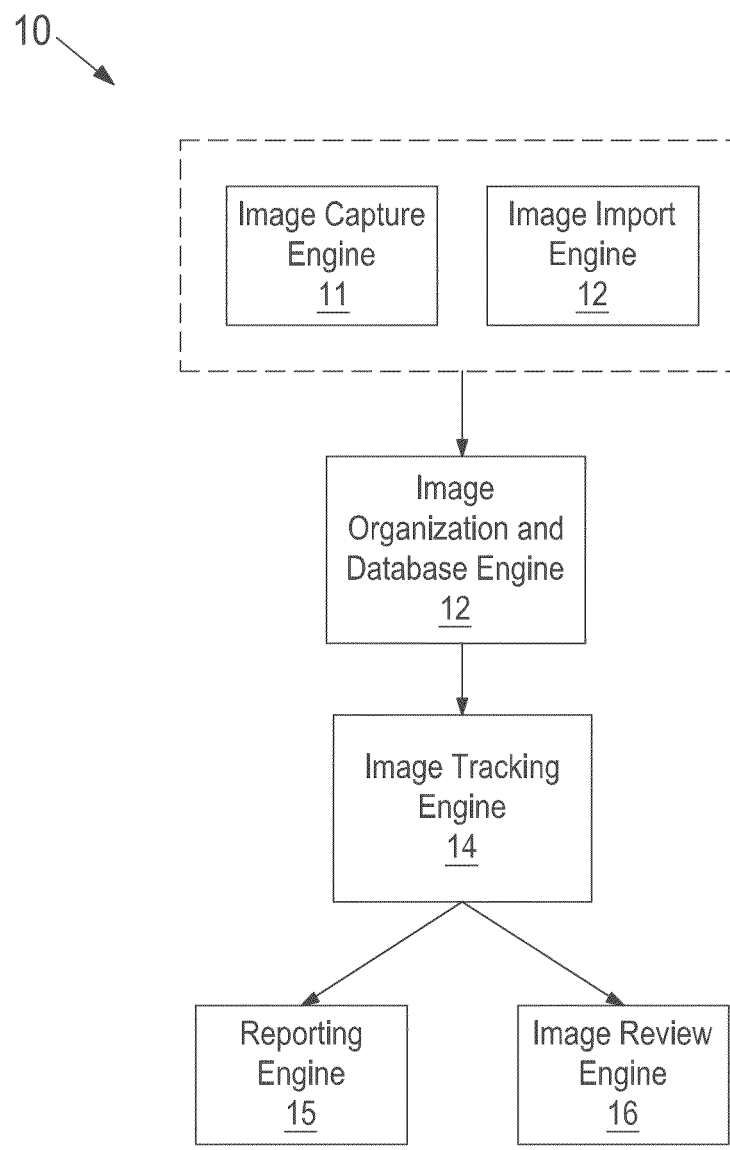
FIG. 2 is a block diagram view of various components for the processing of medical imaging data to calculate an intervertebral motion according to one embodiment of the present disclosure.

Referring to FIG. 2, a basic flow of the process 10 according to one embodiment of the present disclosure includes one or more sub-processes, referred to herein as engines. In one embodiment, the method includes capturing images via an image capture engine 11 or importing data from a medical imaging system via an image import engine 12. An image organization and database engine 13 is configured to provide image organization and database storage as appropriate for a given situation or clinical application. Responsive to receiving captured and/or imported data, the system proceeds through a process of tracking individual vertebrae via an image tracking engine 14, automatically or manually, for example, per request of a system user. At the completion of tracking, the system creates one or more reports, automatically or manually in response to a user request, the one or more reports describing motion between tracked vertebrae via reporting engine 15. Alternatively, at the completion of tracking, a system user can use the system to review the images via image review engine 16. In either the generation of the report or the reviewing of images, the same can be performed with, or without feature stabilization in use or operation. The various engines will be described in further detail herein below.

According to one embodiment an information handling system is programmed with computer software to implement the various functions and functionalities as described and discussed herein. Programming of computer software can be done using programming techniques known in the art.

As discussed herein, the method for tracking vertebrae in a sequence of medical images is implemented using a computer system. The computer system can include a conventional computer or workstation having data input and output capability, a display, and various other devices. The computer runs software configured to calculate and visualize intervertebral motion automatically or manually according to desired actions by a system user, as discussed further herein below.

Referring again to FIG. 2, the image capture engine 11 and or image import engine 12 provide mechanisms for getting image data into the system. Data can be transferred to the system via a computer network video or image acquisition board, digital scanner, or through disk drives, tape drives, or other types of known storage drives. After transferring data to the computer system, the method of importing and organizing the image data is implemented via an image organization and database engine 13. This can be accomplished through a user-interface 19 (FIG. 3) that allows the user to enter a new patient and associated information, and implements a study selection list containing a list of studies in the database that are available for analysis or review. The study list is constructed during application start-up by scanning the database for all available studies. For each study listed in the database, an entry will appear or be made in the list of studies on the user interface. During system operation, the user may click on any study in the list to load the corresponding study.

The magnification of the images must be known in order to calculate relative motions between vertebrae in real-world units. In digital medical images, the magnification is usually described by the pixel size, which is the dimensions of each picture element (pixel) in units of millimeters or other defined unit of length. If images are acquired directly into the computer system, the magnification of the imaging system must be known and input to the system. If images are imported, the magnification can either be determined from information in the header of the image data file, or can be defined by the user.

Many current medical images are in DICOM format, and this format usually has information in the header regarding the pixel size. If not, the user can be prompted to draw a line, or identify two landmarks, and then give the known, real-world dimensions of the line or between the points. The pixel size is then calculated as the number of pixels between points or the length of the line in pixels divided by the known length. A third alternative is to allow the user to directly specify the pixel size. A fourth alternative is to place an object with a unique geometry and known dimensions next to the spine when it is imaged. In the latter instance, the object can then be automatically recognized when importing the images, allowing for automated image scaling.

One goal of the embodiments of the present disclosure is to track the position of a specific vertebra in a sequence of medical images. Accurate tracking relies on rich texture, defined as wide variation in gray levels within and particularly at the boundaries of the vertebra being tracked. Sometimes it's necessary to enhance the features of an image to create greater contrast, better definition of vertebral edges, or reduce noise in the search model and/or target images.

One approach is to apply an image processing technique called 'Histogram Equalization'. Histogram equalization creates gray-level variations within regions that appeared more uniform in the original image, and has the effect of non-linearly enhancing certain details (i.e. making dark areas darker and light areas lighter). Histogram equalization involves first creating a histogram describing how many pixels are at each of the possible values. A transformation function is then applied to the pixels values that uses the histogram to spread the pixel values over a greater range of pixel values. A variation of histogram equalization is a technique called Histogram Stretching or matching which re-maps all gray levels to a full dynamic range based on a user specified distribution function.

For tracking vertebrae in medical images, histogram equalization or stretching can be done over a user selected range of gray-scale values or can be weighted in a particular manner to exclude or correct specific image artifacts, such as blooming in fluoroscopic images. A third technique for improving image quality implements a gamma curve that non-linearly expands the range of gray levels for bone while suppressing the range of gray-levels for soft tissue. For tracking of medical images of the spine, a wide variation in the gray-levels corresponding to bone is most desirable because bone is usually the object being tracked.

Alternative techniques that can be used to improve the quality of the tracking, by enhancing the variation in grey levels in and around vertebrae, include: 1) contrast Limited Adaptive Histogram Equalization (CLAHE), 2) Low-pass or high-pass filtering, 3) Thresholding, 4) Binarization, 5) Inversion, 6) Contrast enhancement and 7) Fourier transformation. These techniques are described in Gonzalez R C, Woods R E. Digital Image Processing, 2nd edition. Prentice Hall, Upper Saddle River, N.J. 2002 which is incorporated by reference.

Tracking of vertebrae in medical images can also be improved through the application of certain edge detection algorithms. Edge detection and/or edge enhancement algorithms that can improve the tracking of vertebrae in medical images include; gradient operators (such as Sobel, Roberts, and Prewitt), Laplacian derivatives, and sharpening spatial filters, as defined in Gonzalez R C, Woods R E. Digital Image Processing, 2nd edition. Prentice Hall, Upper Saddle River, N.J. 2002 which is incorporated by reference. These algorithms alter the original image to make the edges of objects in the image appear to be more distinct and can improve the accuracy and reliability during tracking of vertebrae in certain types of medical images.

According to one embodiment, the computer system is programmed via suitable software to provide easy access to a range of image enhancement and edge detection algorithms. The image enhancement and edge detection algorithms allow for tracking of a much wider range of images, image qualities, and object features. To reduce noise in fluoroscopic images in particular, if many images have been taken of the spine during a motion maneuver, there can be little motion of the spine between immediately adjacent frames. In that case, adjacent images can be averaged together to create a new image sequence. Averaging together of adjacent images can significantly reduce noise in the images.

Figure 4A:
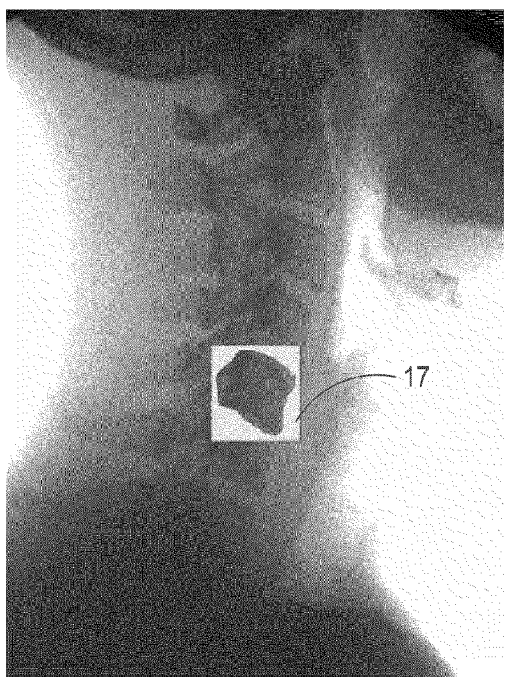
FIGS. 4a and 4b are illustrative example radiographic images of the spine showing a search model region (the square in the image of FIG. 4a) with selected areas masked-out and the anatomic landmarks (in the image of FIG. 4b) that would be associated with the model.
Figure 4B:
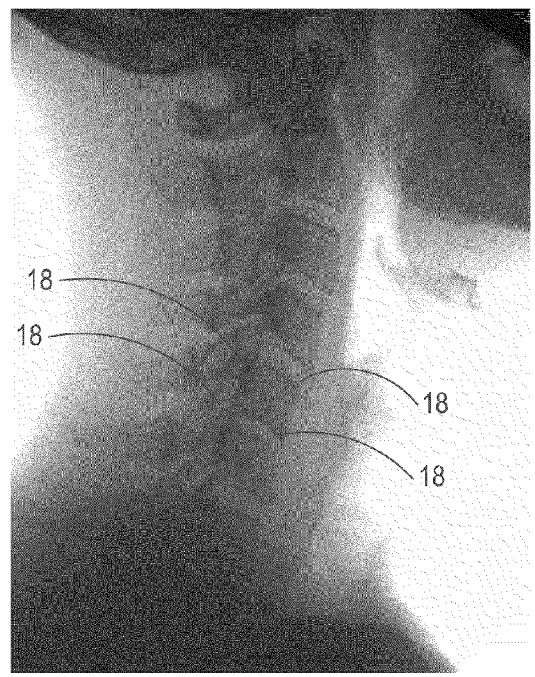

After importing or acquiring image data, and improving the quality of the images, the next step in analyzing intervertebral motion is to track the motion of individual vertebra. Tracking is the process of determining the precise position and orientation of an object in two or more (usually many) images. FIGS. 4a and 4b are illustrative example radiographic images of the spine showing a search model region (the square 17 in the image of FIG. 4a) with selected areas masked-out, and the anatomic landmarks (indicated by reference numeral 18 in the image of FIG. 4b) that would be associated with the model.

Figure 5:
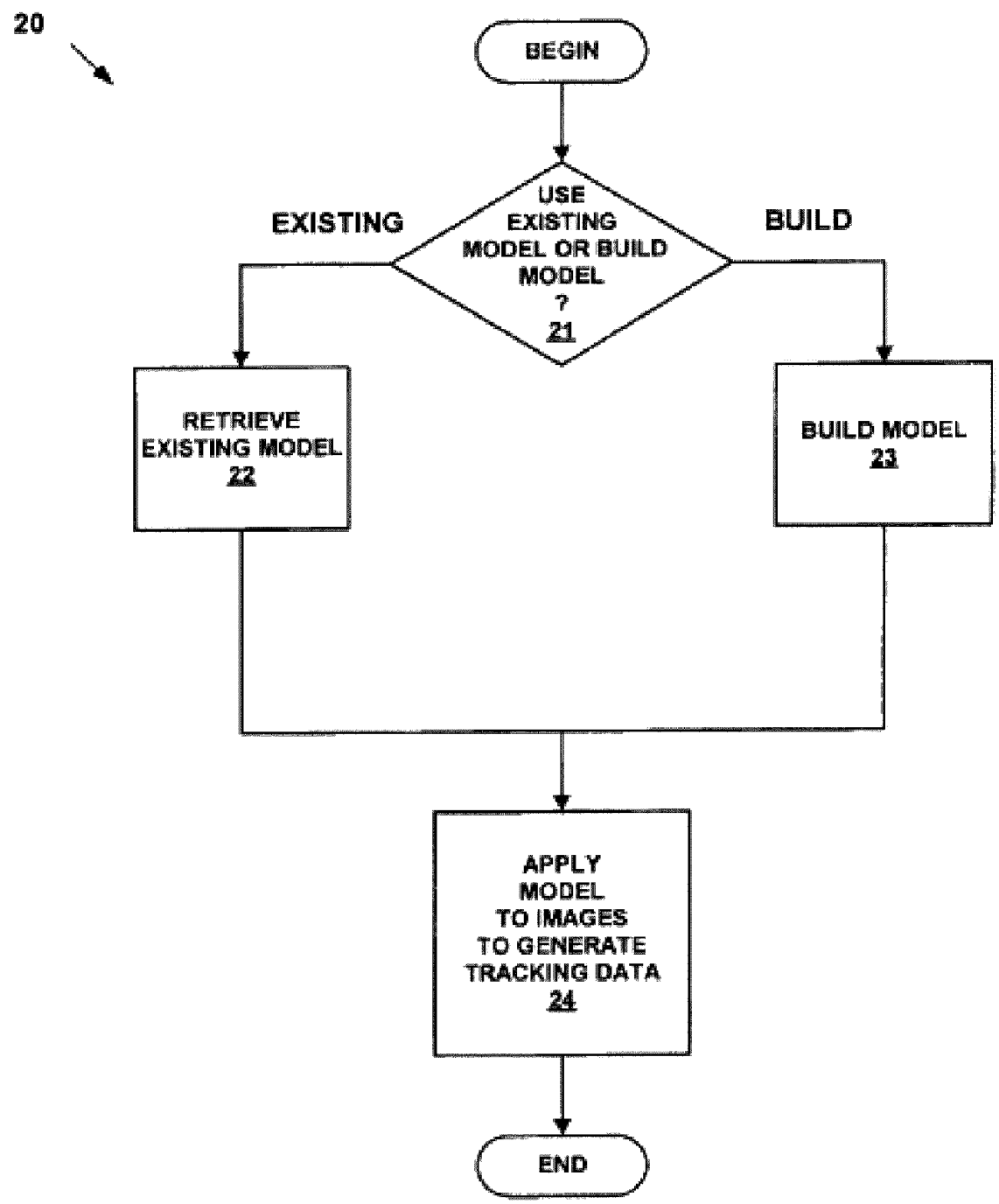
FIG. 5 is a flow diagram view of decision making to either create a new model or use an existing model in the method according to one embodiment of the present disclosure.

FIG. 5 is a flow diagram view of decision making to either create a new model or use an existing model in the method according to one embodiment of the present disclosure. Automated, or semi-automated tracking uses a search model 20 (FIG. 5). The search model represents the image characteristics (geometry and density variations) of the specific vertebra or object (implant, pathologic feature, etc) being tracked. With respect to the tracking of vertebrae in radiographic (x-ray) images, this technique involves identifying a small region 17 within a source image (FIG. 4a) that contains the vertebra or object of interest. This region containing the object to track is called a search model or template. The search model is used to find similar regions in subsequent 'target' images that contain identical information as the model 20 (FIG. 5).

Models also may have specific anatomic landmarks 18 associated with the model, such that the geometric relationship between the model and the landmarks is defined (FIG. 4b). The search model is used to find the best match by interrogating each image in a sequence of images to locate the position and orientation of the model that yields the best match with the object being tracked. It is possible to either define a new model or use an existing model 20 (FIG. 5). The user is first prompted at 21 to either use an existing model or build a new one. If the user chooses to use an existing model, the chosen model is retrieved at 22. If the user chooses to build a model, then a model is built at 23. The method further includes applying the model to the images to generate tracking data at 24.

Identification of the vertebrae to be tracked also is used to establish the frame of reference for relative motion calculations. The frame of reference can be defined by the user selection of 3 or more landmarks which define a Cartesian coordinate system. Alternatively, the frame of reference can be defined by the user drawing 2 or more lines which in turn define a Cartesian or Polar coordinate system Identification of the vertebrae to be tracked can be accomplished by drawing a region of interest around the vertebrae. Identification of the region of interest (ROI) can also be done manually by the operator, by tracing the boundaries of the ROI, or defining the ROI by a box, circle or other simple geometric shape.

Identification of the vertebrae to be tracked can also be computed from anatomic landmark points identified by a system operator, or the identification of the region of interest can be accomplished by a user identified point in or near the vertebra, or with the computer, using various segmentation algorithms to identify the entire region of interest. Automated identification of the features to be tracked can also be accomplished by various segmentation algorithms, for example, that can include thresholding, seed growing, or snakes, as defined in Gonzalez R C, Woods R E. Digital Image Processing, 2nd edition. Prentice Hall, Upper Saddle River, N.J. 2002 which is incorporated by reference.

Finally, the vertebra to be tracked can also be defined from a library of templates to use as the basis for the region of interest. Embedded in the process of identifying landmarks, a method that allows the operator to manually mask out any undesired areas from the region of interest can also improve the tracking process. Once the search model or template is identified, it is used to interrogate each image such that the position and orientation of the model that yields the best 'match' with the object being tracked is found 24 (FIG. 5). The rotation and translation of the model that yields the best match, describes how the vertebra moves from image to image.

Figure 6:
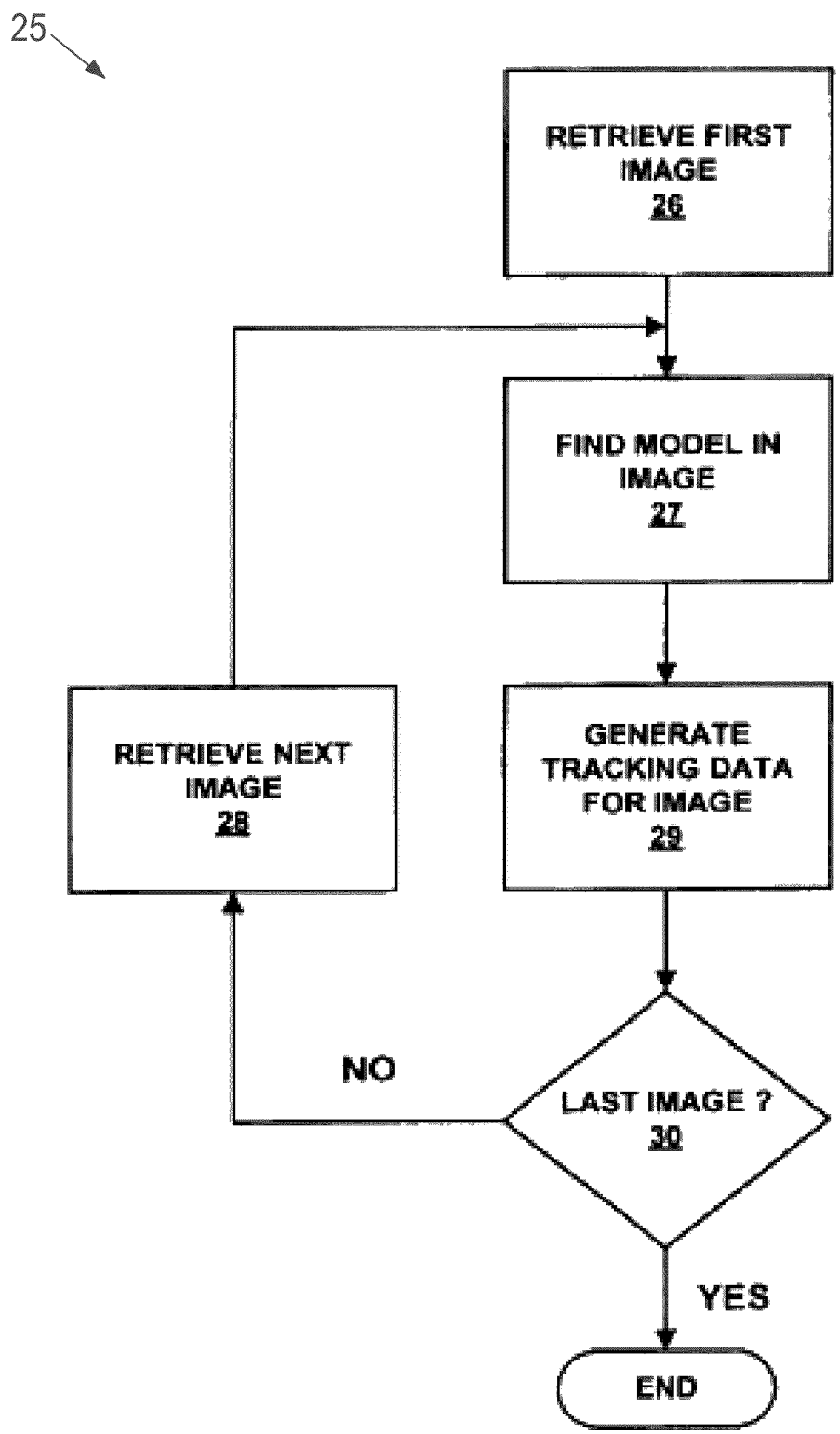
FIG. 6 is a block diagram view of the steps and tasks for tracking multiple images from a sequence of images according to one embodiment of the present disclosure.

The tracking process is iterative (FIG. 6). The first image is retrieved 26 and the search model 27 is identified in that first image. The tracking data are found for the image 29, a check is made to see if the last image has been reached 30, and if not the next image is loaded 28. When the last image is reached, the tracking stops.

There are several methods by which the match is computed, and the specific method used depends on the image quality, the amount of out-of-plane rotation, and the features of the vertebra being tracked. One technique, called Normalized Grayscale Correlation, determines the best match by computing the degree of similarity in densitometric information between the search model and underlying image. The basics of this technique are described in Gonzalez R C, Woods R E. Digital Image Processing, 2nd edition. Prentice Hall, Upper Saddle River, N.J. 2002 which is incorporated by reference. Specific improvements to the basic technique are used for tracking vertebrae in medical images, to improve tracking speed, accuracy and reliability. Another technique, called Geometric Searching, computes the closeness of the match by finding the best fit between a set of contours in the search model and the underlying image. A third technique involves computer-assisted manual matching of one frame to another. The quality of any type of automated tracking is assessed by a score that describes how close of a match was found between the original image and the tracked position of the search model.

Applied to tracking vertebrae for the purpose of measuring motion in the spine, grayscale correlation is the process of mathematically assessing the similarity between defined regions within two or more images. The technique provides a method to search for the position of a defined vertebra in a new image, based on how similar the region being searched is to the original image of the vertebra. Grayscale correlation uses the process of image convolution. Image convolution is the mathematical process of creating a new image by passing a section of an image or an image pattern over a base image and applying a mathematical formula to calculate the new image from the defined combination of the base image and the image section that is passed over it.

Figure 7:
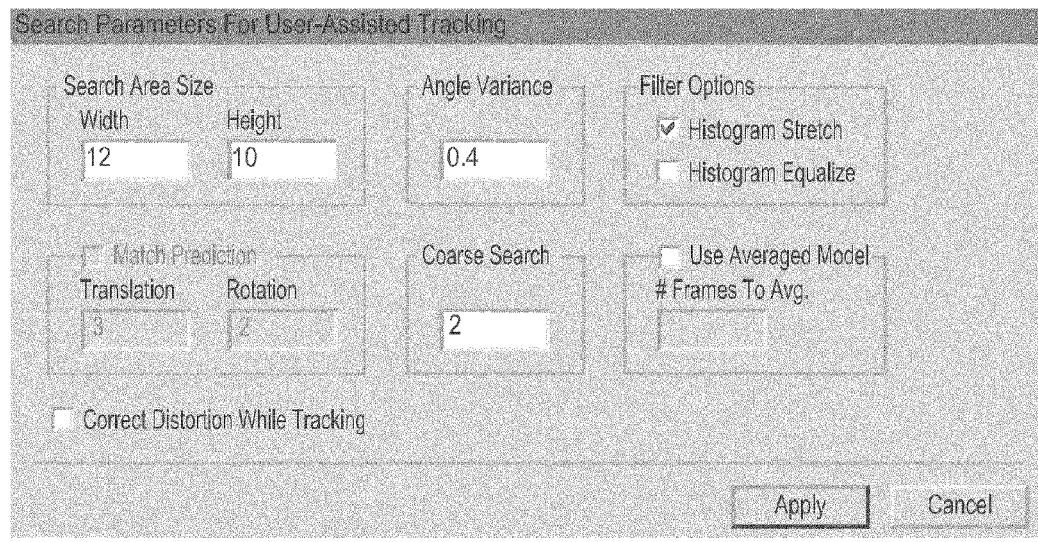
FIG. 7 is an example graphical user interface view configured to allow a system user to adjust search parameters used during tracking of a vertebrae in a sequence of medical images.

Furthermore, as applied to tracking vertebrae, a search model is first defined. The user can be given the option of masking out certain pixels that could adversely affect tracking. A convolution is then performed whereby the search model is passed over a defined region of the target image, and rotated and translated defined amounts until the optimal match is found. While tracking vertebrae, the size of the search region is constrained to improve speed and avoid finding adjacent vertebrae. In addition, the amount that the model can be rotated or translated is also limited to improve speed (FIG. 7).

Figure 8:
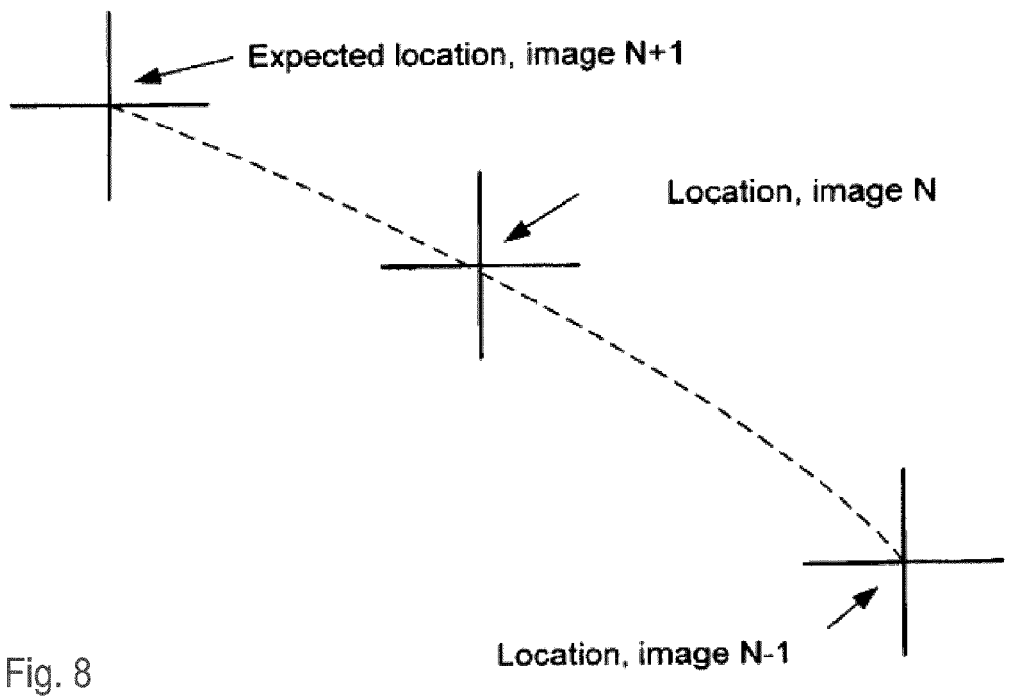
FIG. 8 is a diagram view illustrating how the position of an object being tracked can be anticipated (N+1) based on data describing where the object was in the previous frames (N and N−1)

The amount that the model is rotated or translated can also be predicted by knowing how far, and in what direction, the vertebra had moved between the previous two images (FIG. 8). In addition, the size of the search region can be automatically made smaller or larger based on recent large changes in position or anticipated large changes in position. Additional improvements to grayscale correlation that improve tracking of vertebrae include mean-centering, using adaptive contours for automatic boundary delineation, hierarchical searching, and fast peak finding to avoid exhaustive searching at the final stages of tracking. Grayscale correlation is more robust than alternative strategies, such as minimizing the sum of the squares of the pixel intensity differences, and is insensitive to uncorrelated noise as the noise components are averaged out in the correlation process.

Applied to tracking vertebrae, the process of normalization is employed, whereby the grayscale values that makeup the image are divided by the average grayscale level of the image. This normalization process is performed to avoid always finding the best match where the pixel gray level values are largest, regardless of their arrangement within the image. Grayscale correlation can be combined with certain edge detection algorithms that create a binary representation of the images in which only the edges of the vertebrae can be seen. Each pixel in the image represents either an edge or nothing.

In one embodiment of the present disclosure, a variant of the grayscale correlation technique is used to process binary filtered images. The idea here is that the geometric information contained at the boundaries of the vertebra (in the form of edge information) can be extracted by gradient edge detection algorithms. Common edge detection algorithms include sobel, box car, canny edge detection, phase congruency and others that are defined in the published literature. This results in gradient-based images that can then be used to perform vertebral tracking. This is particularly advantageous for tracking lumbar vertebra that lack significant densitometric information within the interior of the vertebral body.

Another improvement that can be used when tracking vertebrae using grayscale correlation is to first search over a low-resolution version of the image to get the approximate location of the vertebra, and then search over a much smaller region to find the exact location of the vertebra. If the gradient-based images used for correlation are binary images, its no longer necessary to perform many of the optimization techniques required to make grayscale correlation reliable. For instance, normalization, mean-centering, and graylevel remapping are no longer required leading to improvements in search speed.

An alternative to grayscale correlation is geometric tracking. One of the most effective geometric tracking algorithms for use in measuring motion of vertebrae, is the Hough transform. The Hough Transform is a powerful technique in computer vision used for extracting (or identifying the position and orientation of) geometric shapes, also called features, in an image. The main advantage of the Hough Transform is that it is tolerant to poorly defined edges and gaps in feature boundaries and is relatively insensitive to image noise. In addition, the Hough Transform can provide a result equivalent to that of correlation-based template matching but with less computational effort. Furthermore, the Hough Transform handles variations in image scale more naturally and efficiently that correlation-based methods.

Figure 9:
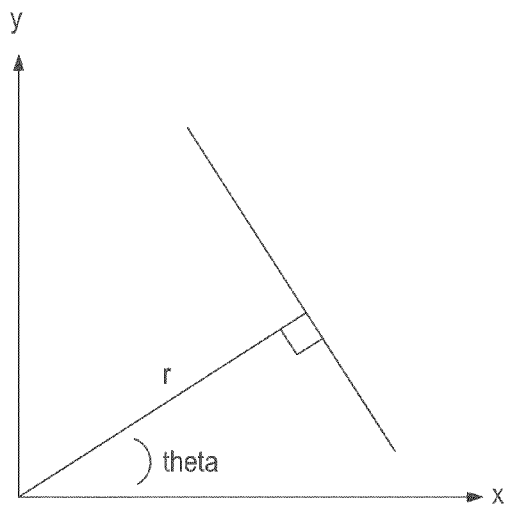
FIG. 9 is an illustrative plot in connection with using the Hough Transform for finding a straight line through a set of discrete points, for example, according to one embodiment of the present disclosure.

The Hough Transform generally requires parametric specification of the features to be extracted from an image. Regular curves that are easily parameterized (e.g. lines, circles, ellipses, etc.) are good candidates for feature extraction via the Hough Transform. A generalized version of the transform is used when locating objects whose features cannot be described analytically. The main function of the Hough Transform is to fit a parameterized feature, or curve, through a set of image points that define a physical curve. The values of the parameters that yield the best fit between the feature and points indicate positional informational about the physical curve in the image. A in-depth description of the transform can be found in Shape Detection in Computer Vision Using the Hough Transform. By V. L. Leavers. Springer-Verlag, December 1992, which is incorporated by reference To describe the basic theory of the Hough Transform, consider a simple example: finding a straight line though a set of discrete points, e.g. pixel locations output from an edge detector applied to certain edges from images of vertebra in x-ray images. For line extraction, the first step is parameterization of the contour. A simple line can be parameterized using any number of forms, for example:

$$X \cos\theta + Y \sin\theta = r,$$

where r is the length of a normal from the origin to the line and .theta. is the orientation of r with respect to the x-axis. See FIG. 9.

Figure 10A:
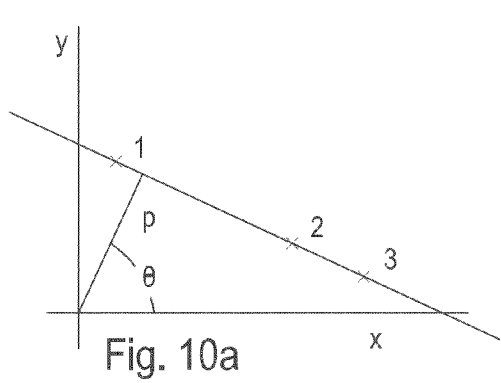
FIGS. 10a and 10b are illustrative plots of possible (r, theta.) values defined by each known point in FIG. 10a that are mapped to curves in the Hough parameter space of FIG. 10b.
Figure 10B:
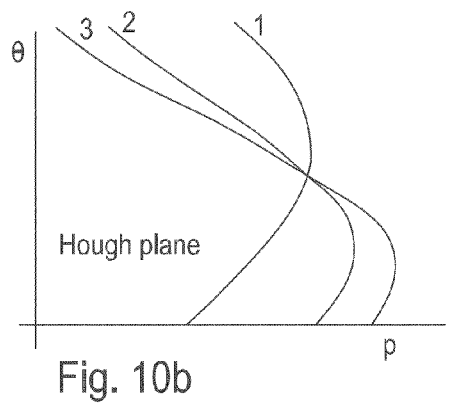

In the context of image analysis, the points output from an edge detector are usually known. Since the coordinates of the points are known, they serve as constants in the parametric line equation, while r and .theta. are unknown variables. For each point we can assume a range of values of .theta. and solve for r for each .theta. If we plot the possible (r, .theta.) values defined by each known point, the points in the Cartesian image space will map to curves in the Hough parameter space. When viewed in the Hough parameter space, points which are collinear in the Cartesian space yield curves that intersect at a common (r, .theta.) point. See FIGS. 10a and 10b.

To determine the point(s) of intersection, the Hough parameter space is quantitized into finite intervals or accumulator cells (also called bins). This quantization determines the interval of each .theta. that we use to compute r (e.g. every 5 deg. 1 deg. etc). As each point in Cartesian image space is transformed into a discretized (r, .theta.) curve, all accumulator cells that lie along this curve are incremented. This is called voting. Curves that intersect at a common point result in peaks (cells with large number of votes) in the accumulator array. Such peaks represent strong evidence that a corresponding straight line exists in the image. Identification of multiple peaks, indicates that multiples lines may exist in the image, usually one for each peak found. The value of (r, .theta.) for each peak found, describes the position and orientation of each line detected in the image.

The Generalized Hough Transform can be used to extract vertebral contours from radiographic images. The generalized version of the transform is used in place of the classical form when the shape of the feature that we wish to isolate does not have a simple analytic equation describing its boundary. The irregular shape of most spinal vertebrae, for example, resists a straightforward analytical description. In this case, the shape of a vertebra is represented by a discrete lookup table based on its edge information. The look-up table, called an R-table, defines the relationship between the boundary positions and orientations and the Hough parameters, and serves as a replacement for an analytical description of a curve.

Look-up table values are computed during a preliminary phase using a prototype shape. The prototype shape can be created by any means such as graphical picking of points along the edge of the curve in an image or a generic vertebral geometry can be used. The generic vertebral geometry can be determined by analysis of a large number of images of the spine to determine a typical geometry that describes many vertebrae. Once the prototype shape, or feature, has been described, an arbitrary reference point ($X_{ref}$, $y_{ref}$) is specified within the feature. The shape of the feature is then defined with respect to this reference. Each point on the feature is expressed using a set of parameters that take into account the location of the feature reference point, the angle of the feature and, if necessary, the scale of the feature. The Hough parameter space is subsequently defined in terms of the possible positions, angle and scale of the feature in the image.

Searching for the feature in an image involves searching the Hough space for the maximum peak in the accumulator array. When searching for the location ($x_{ref}$, $y_{ref}$) and angle of a feature in image space, the Hough space is three dimensional. (That is, three Hough parameters are required to describe the x-position, y-position and angle of the feature in the image.) When taking scale into account the Hough space becomes four dimensional. In the context of medical imaging applications, objects in radiographic image can change in scale from image to image.

The Generalized Hough Transform can be very effective for locating the position, orientation and scale of a feature in a sequence of radiographic images. The feature typically defines the shape of a vertebra. The procedure is as follows:

A prototype shape of the vertebra is constructed from the first frame of a set of radiographic images to search. The prototype shape derives from one of three methods: 1.) Manual extraction of feature boundaries via mouse-driven segmentation; 2.) Semi-automatic extraction of feature boundaries via Active Contours (Snakes); 3.) Automatic edge detection following by masking of unwanted edge points. The first approach is to use a manual segmentation technique. In the first approach, the user is permitted to zoom-in on an image and manually draw a contour around the edge of the vertebra to track. The points along the contour are stored in an array to be used during construction of the R-table. A second approach is to detect the contour of the prototype shape via Active Contours, also called Snakes. A snake is an energy minimizing model which is popularly used for automatic extraction of image contours. As an active contour, the snake moves under the control of image forces and certain internal properties of the snake namely, its elasticity (tendency to shrink) and rigidity (tendency resist forming kinks and corners). The image forces, usually related to the gradient-based image potential, push or pull the snake toward object boundaries. The snake's internal properties influence the shape and smoothness of the snake. Snakes were first introduced by Kass et. al. in 1987 (Kass, M., Witkin, A., and Terzopoulos. Snakes: Active contour models. International Journal of Computing and Visualization, Vol. 1, 1987, pp. 321-331), incorporated by reference herein.

Figure 11A:
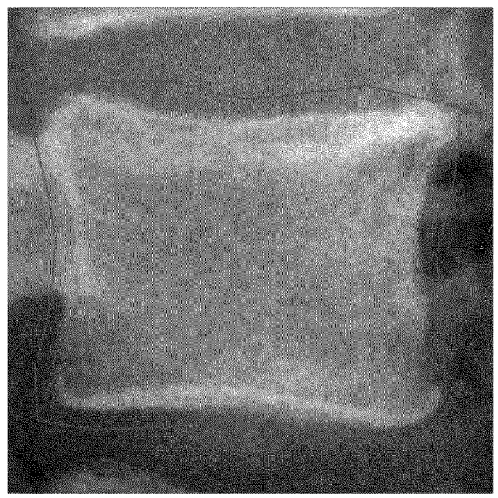
FIGS. 11a and 11b are illustrative image views of example radiographic images of the spine show in FIG. 11a with an initial contour drawn by a user around a vertebrae and a final contour in FIG. 11b subsequent to an application of a method of snakes used to obtain a more refined representation of the vertebral boundaries.
Figure 11B:
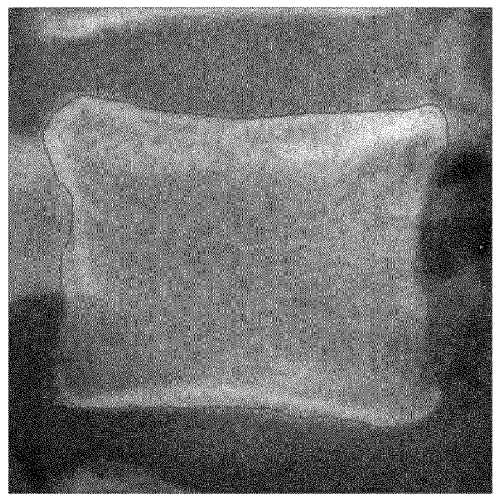

In one embodiment of the present disclosure, snakes are used to track vertebrae. In that embodiment, the user is prompted to draw an initial contour surrounding or overlapping the vertebra to track. The initial contour would be drawn close to the vertebra and would not overlap any adjacent vertebra or other structures. After the initial snake contour has been selected, the snake conforms to the edges of the true vertebral contour (FIGS. 11a and 11b). The individual points that constitute the snake are then stored for later use.

A specific snake method that can be used to implement this type of contour finding is called the Gradient Flow Vector (GVF) snake. There are particular advantages of GVF snakes over other traditional snake methods. These advantages include its insensitivity to initialization (i.e. distance of the initial contour from the 'true' contour can be large) and the initialization can be inside, outside or across the objects boundary. Further details on GVF snakes can be found in Xu, C. and Prince, J. Snakes, Shapes, and Gradient Vector Flow. IEEE Transactions On Image Processing, Vol. 7, No. 3, 1998, pp. 359-369, which is incorporated by reference herein.

An additional method for finding vertebral edges during tracking involves detecting feature edges within a region of interest that can be subsequently edited by the user. The procedure is as follows:

1. The user is prompted to draw a closed curve that completely surrounds the vertebra of interest and no other structures in the image. This is similar to the process of snake initialization described above.
2. Based on the shape of the contour, a bounding box (or region-of-interest) is constructed such that the curve is contained entirely within the region. By association, the vertebra is also contained within the region.
3. An edge detector is applied to the region of interest and the pixel locations (points) that correspond to the detected edges are stored.
4. The points that are located between the closed curve and edge of the region of interest are automatically discarded. The remaining edge points are then drawn into an overlay buffer on the image.
5. The user is then prompted to mask (or erase) additional unwanted edge points.

Masking occurs by graphically dragging the mouse over the points in the image with an eraser tool. After the masking process is complete, the remaining edge points are stored for later use.

Figure 12A:
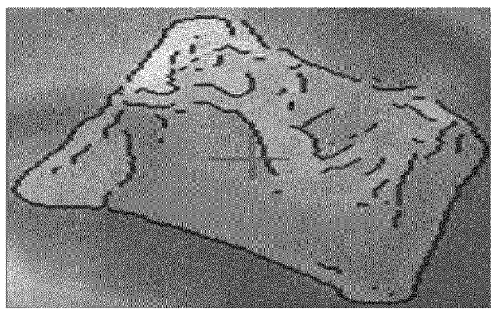
FIGS. 12a and 12b are illustrative image views of example radiographic images of the spine showing the affect of edge detection before masking and after masking to identity the contours of a vertebra, wherein the first image shows the contours before masking (FIG. 12a) and the second image (FIG. 12b) represents the contour that would be used for a geometric searching via the Generalized Hough Transform in subsequent images.
Figure 12B:
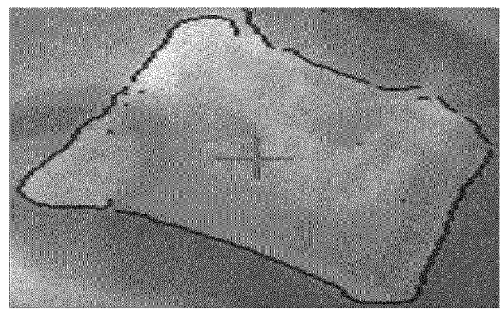

Masking the edge information of contours that don't correspond to the features of interest is an important enhancement following edge detection. When applying an edge detector to a region of an image, the filter will find gradients in densitometric information that may not correspond to contours of interest. Masking this edge information is useful for preventing extraneous edge information from being used during tracking with the Hough Transform (FIGS. 12a and 12b). It also decreases search times because fewer points are transformed into the Hough space.

Once the prototype shape of the desired feature is constructed, an R-table is created to represent the model shape or contour. (The R-table defines the relationship between the geometry of the shape and the variables in the Hough parameter space.) The points along the contour are stored in an array to be used during construction of the R-table. Once the R-table is constructed, the following procedure is applied for each image in the set of radiographic images to search:

1. An edge detector is applied to the current image to generate a set of discrete points that define image intensity discontinuities (i.e. feature edges). A combination of Canny and Phase Congruency edge detectors are used. In most cases, the image is first smoothed with a neighborhood median filter to prevent erroneous detection of noise pixels as false edges.
2. For each edge pixel detected, that point (pixel location) is transformed from Cartesian image space into Hough parameter space in a multi-stage process akin to hierarchical searching. In this process, the Hough parameter space is first quantitized coarsely such that there is large scale sampling in the Hough parameters. Then, cells containing peaks (large numbers of votes) in the accumulator array are interrogated more closely.
3. The transformation from Cartesian image space to Hough space is repeated for the Hough parameters corresponding to peaks in the accumulator array. The sampling interval of the Hough parameters is progressively refined toward cells of the accumulator array containing large numbers of votes.
4. After progressively refining the quantization of the Hough space in the region of peaks in the accumulator array, the final cell of the accumulator array that contains the greatest number of votes is identified and the parameters associated with this peak are stored.
5. The stored Hough parameters are then used to compute the position, orientation and scale of the feature that provided the best fit through the points identifying the edges of the vertebra.
6. The next image is loaded and the process is repeated using the same prototype shape on the new image.

Several improvements can be made to the basic Hough transform algorithm that greatly improve performance (speed, accuracy, and reliability) when applied to medical images of the spine. During edge detection, a large number of points are determined to be edges that are not true edges. This is especially true in noisy images even after smoothing. Prior to transforming each point into the Hough parameter space, a neighborhood operation is performed to determine whether that point is part of a continuous curve (defining an edge) or an isolated edge point. Isolated edge points are identified by searching the eight neighborhood pixels surrounding the point. If no more than one pixel is found within the neighborhood, the point is discarded (i.e. not transformed into the Hough parameter space). This speeds processing because it leads to fewer points requiring transformation.

When tracking dynamic image studies (e.g. video fluoroscopy sequences), motion estimation can be used to constrain the number of points requiring transformation into the Hough parameter space. As when tracking video fluoroscopy sequences via grayscale correlation, it is often useful to exploit knowledge about the way vertebrae move. Since vertebrae move in a continuous fashion with little or no acceleration, its possible to estimate the location of a vertebra in one frame given its location in previous frames. This means that a relatively small region of an image can be processed with an edge detector, i.e. the region where the feature is expected to be found. As result, fewer points are required for transformation into the Hough space.

Knowledge about the range of motion of vertebra can also be exploited to increase searching efficiency in the Hough space. Because vertebra undergo a predictable range of motion, its possible to narrow the range of Hough parameters required to be sampled. Narrowing the range of parameters to sample leads to faster construction of the Hough space. For example, when tracking a vertebra in a set of digitized x-rays, lumbar vertebra will rotate by no more than +/−20 degrees. This information is useful when indexing into the R-table and reduces the size of the Hough space.

Figure 13:
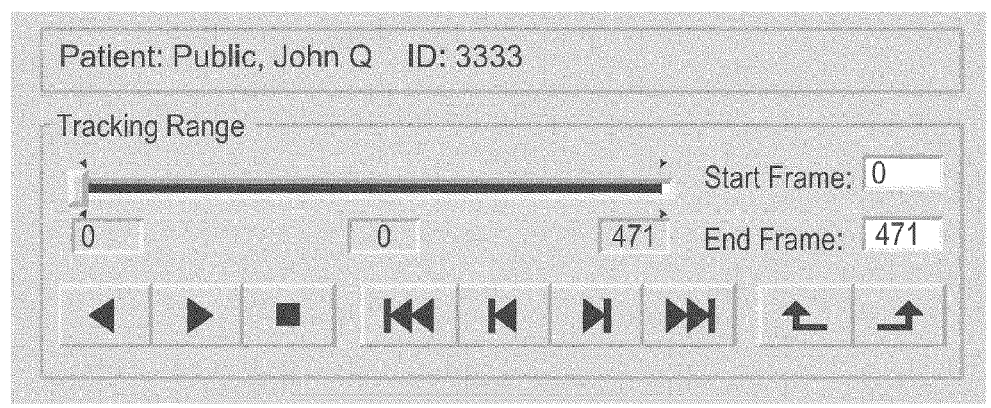
FIG. 13 is graphical user interface view of an example interface showing how a range of images from a larger sequence of images can be selected for the purposes of tracking over a user specified portion of the images.

Several other methods can be used to improve a performance of a computer system configured to measure motion between vertebrae according to the present embodiments. To track vertebrae in a large number of images, such as would be obtained from a fluoroscopic imaging study of the spine, the computer system allows the user to select the range of images (images) to track (FIG. 13). This allows the user to measure intervertebral motion for a specific motion in the spine and allows the user to exclude images from the sequence that are of poor quality. The user can be guided through the process of creating a model and identifying landmarks by a software function that shows the user example images, and provide explicit instructions about how and when to apply each step of the process. This guidance includes showing example images including the specific anatomy being tracked along with sample models.

In the method of the previous paragraph, during tracking, a Picture-In-Picture (PIP) window may be displayed that shows the tracking model with the landmarks shown at their defined coordinates. The PIP window assists the user in observing the quality of the tracking as the tracking process progresses, so that adjustments can be made before the process is completed. Visual feedback about the tracking process helps identify any errors in the process. Feedback includes the location of the model and landmarks on each image.

It is also important to detect peaks in the accumulator array. If a 'true' Hough parameter value happens to lie close to a boundary in the quantitized parameter space, the votes will get spread over two or more accumulator cells (bins). Therefore looking at single bins may not reveal the peak. This is helped by smoothing the accumulator array using convolution, before searching for peaks.

In addition, if two adjacent bins have large peaks, the parameter values corresponding to each accumulator bin can be averaged to estimate the peak position, and thus the 'true' parameter value. This is a substantial improvement over assuming that the peak position occurs at the center of each bin. The exact Hough parameter values can be estimated from the parameter values corresponding to the accumulator bins surrounding and including the peak. A surface is fitted to the parameters around the peak and, from the equation of the surface, the exact 'peak' position is calculated.

From the exact peak position, the exact parameter values can be determined. This peak finding technique can be also be used to increase search speeds. Peak finding based on surface fitting avoids the need to iteratively refine the quantitization of the Hough space to such a degree that search times begin to degrade.

In addition to fully automated tracking, semi-automated or manual tracking processes can facilitate measurement of intervertebral motion. The computer system can provide a means to allow the user to manually adjust the automated results. Upon completion of tracking, the user can be presented with a graph of all tracking results that allows the user to review each image of the sequence with the tracking results overlaid. The user is prompted to accept or reject the tracking results prior to saving the data to disk.

A completely manual tracking process is also used, particularly when automated tracking would not work well due to poor image quality or out-of-plane motion that must be subjectively interpreted. During manual tracking, the picture-in-picture window with the model and landmarks is displayed, and the new match is defined by positioning the landmarks on the image to be tracked. The landmarks are displayed on the image to be tracked at the last specified model location. The landmarks can be translated and or rotated as a group by clicking and dragging the mouse or pointing device. When a new match is defined, the tracking process may be continued in Manual mode or may be switched to Automatic or User Assisted mode as is deemed appropriate.

The quality of the tracking may be individually checked and or adjusted for each image in the sequence. The model location and or orientation in each image being checked may be modified by specified amounts. Simple controls to shift the model up or down, left or right, or rotate the model are all that is needed. The adjustments may be saved or discarded. Smoothing may be applied to the tracked data to minimize noise in the tracked data. Each image being checked is compared to the original image from which the model was constructed. The two images are displayed alternately.

As the images switch, a box is displayed around the image being checked. This gives a simple visual cue as to which image is being adjusted. As an alternative to alternately displaying two images, a single new image can be constructed by merging two images. A percentage of the reference image and a complimentary percentage of the image being checked are utilized in constructing this new composite image. A perfect match produces an image of the tracked vertebra that is indistinguishable from that of the reference image. Another alternative to alternately displaying two images, is to display the two images in two different colors. Where the two images match, a third color is displayed. Throughout the process of checking and adjusting the quality of the tracking, a point, line, or other marker can be superimposed on the display to serve as a spatial reference. This point, line, or other marker can also be drawn to a specific size to help the user appreciate the magnitude of any errors in the tracking.

Figure 14:
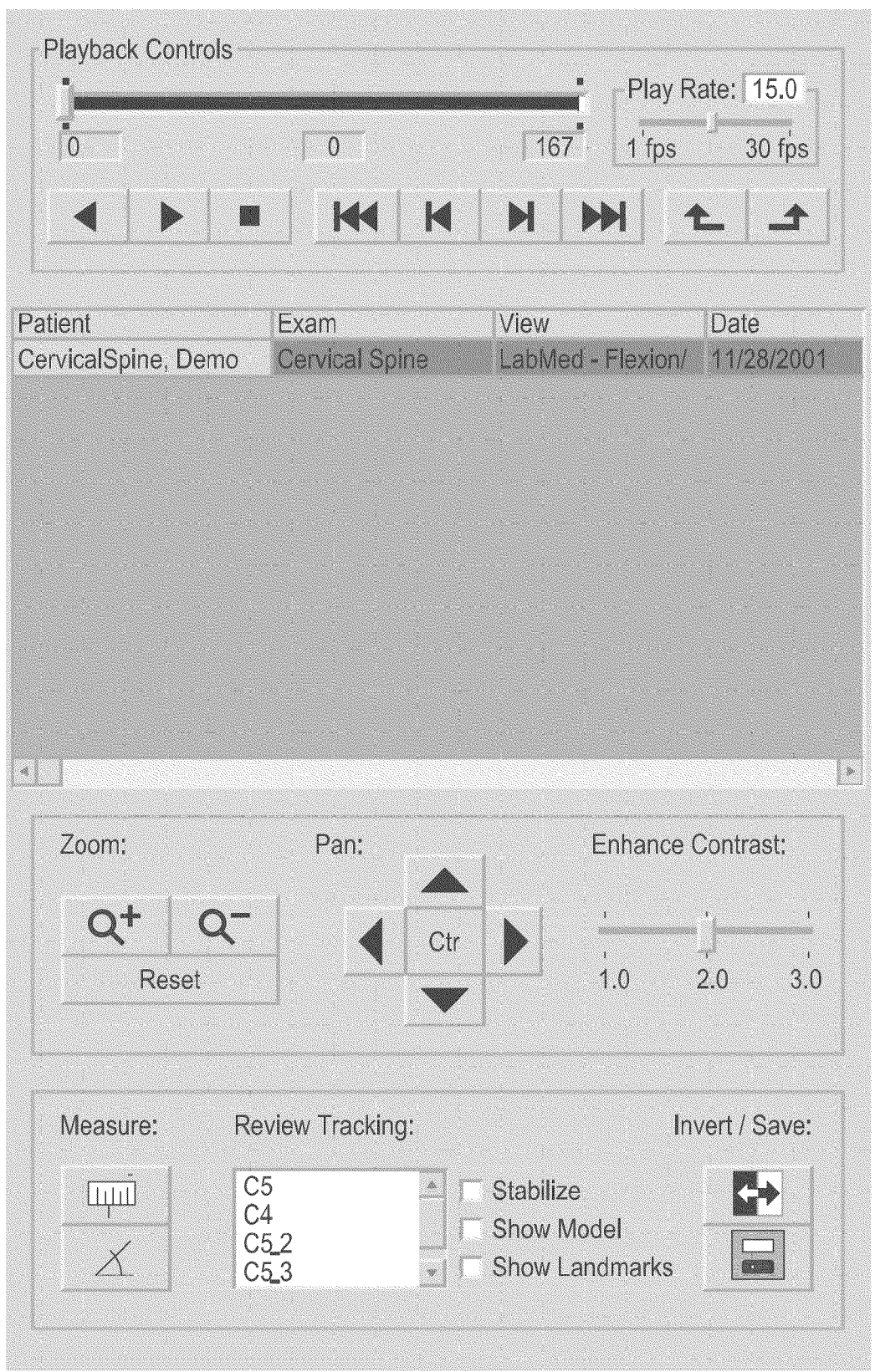
FIG. 14 is a graphical user interface view of an example user interface that allows a user to play back and review images of the spine in motion, with, or without feature stabilization active, wherein feature stabilization uses the results of tracking of a vertebrae to make the selected vertebrae remain in a constant location on the screen as the multiple images are displayed.
Figure 15:
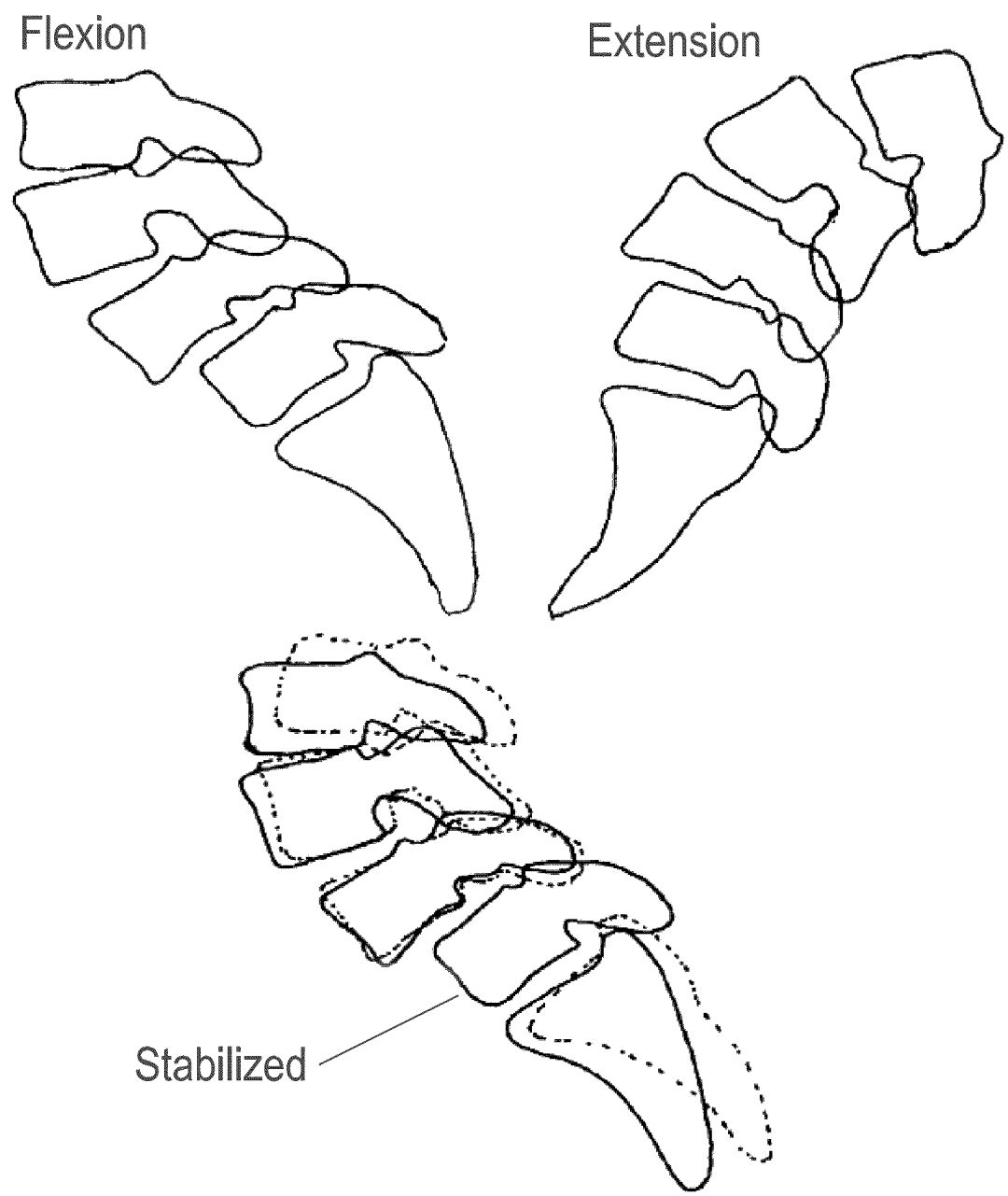
FIG. 15 is a schematic diagram view of a spine in two positions before tracking, as well as the stabilized image view wherein one of the vertebra is in a constant position, allowing relative displacements of adjacent vertebrae to be clearly seen.

After tracking has been completed, computer assisted display functions are used to take advantage of the tracking results (FIG. 14). These display functions allow the user to replay the image with a selected vertebra stabilized. Stabilized means that the selected vertebra remains in a constant location on the screen as the sequence of images is displayed (FIG. 15). To control how the images are displayed, the following features are used for displaying multi-image sequences: Play (Forward and Reverse), Pause, and Stop. Playback can be set to display images within a user-selected play rate. Looping automatically occurs when the last image of the video is reached. Manual image advance features are available when the video is stopped or paused. These features include skipping to the first or last image of the video and advancing to the previous or next image. Range checking is performed to prevent the user from advancing beyond the video bounds.

Display features can be provided for static or moving images: Contrast Enhancement, Invert, Zoom In, Zoom Out Zoom Reset, Pan Left, Pan Right Pan Up, Pan Down, Pan Center, Print. Zooming In/Out will enlarge/reduce images by a defined percentage of the current image size. Panning will shift images in increments of 2 pixels, as an example. Printing and saving are available for saving hard-copy and soft-copy output of the current image in the display area. Effects of zooming, panning and contrast enhancement are applied to the printed saved image.

When displaying image data, patient demographics and study information can be annotated in the upper left corner of the display window. This information can include: patient name, patient ID (identification), referring physician, study date, study time, study type and study view. All annotation information can be burned into the image when saving or printing the contents of the display window.

In another exemplary embodiment of the invention, a method for stabilizing and displaying relative motion between vertebrae may be provided. In the exemplary method, a sequence of at least two images of the vertebrae to be tracked or compared to each other for relative motion are first acquired. The images may be acquired by any known technique for acquiring images of skeletal structure, such as x-ray or MRI technologies. Generally speaking, each of the at least two images will capture a portion of a region of interest. For example, if the region of interest includes two or three adjoining vertebrae, then each of the at least two images will contain the two or three adjoining vertebrae. Further, in order to display relative motion between the adjoining vertebrae, generally each of the at least two images will be taken with the adjoining vertebrae in different positions. In at least one embodiment of the invention, the at images are taken from substantially the same acquisition position, i.e., the position of the camera relative to the patient is substantially the same for each of the images. In another embodiment of the invention the camera position (acquisition position) may be different, and the method of the invention may be configured to compensate for the different camera angle by applying translation techniques to at least one of the images before displaying the images to the user.

For example, a first image of the adjoining vertebrae may be taken with the patient's torso in a substantially linear path, i.e., with the patent lying flat or standing straight up. A second and or subsequent images may be taken with the patient in various bending positions, i.e., partially bent over in a forward direction or lying with legs pulled up toward the pelvis. Regardless of the exact bending position, the intent of capturing a plurality of images is to capture the vertebrae of interest in at least two different positions so that the relative movement between the vertebrae at (least) two different positions can be captured in the images. Similarly, if the images (area of interest) are of a joint, then each image may be of the joint in different positions. For example, if the practitioner is interested in relative movement between bone structures in a patients knee, then one image may be of the patients knee with the leg straight, another image may be of the patient's knee with the leg bent 30°, and another image may be of the patient's knee bent 60°. Additional images at various angles may be taken to illustrate various ranges of motion. For example, angular movement of any joint or of a patient's spine may be in any angular increment from about 1° to about 90°, with practitioners generally using between about 15° and about 30° or between about 5° and about 20°. In other exemplary embodiments of the invention, the movement of the joint or vertebrae to be illustrated may be other than a simple bending movement. Other movements that the method of the present invention may be used to analyze include twisting, stretching, etc. In sum, the method of the present invention may be used to measure relative movement of vertebrae or any other bone structures between any first position and any second position that is different from the first position.

Once the images of the area of interest at the selected (sometimes angular) positions have been acquired, the images may generally be converted or otherwise transformed into an electronic format (if the images are not already in an electronic format, such as a digital format). Once the images have been acquired and are in an electronic format, the method may continue to store the at least two electronic images on a computer readable medium. The stored images may be processed in accordance with any of the image processing techniques described or referenced herein or generally known in the art. Additionally, the invention is not intended to be limited to processing of only stored images, as in at least one exemplary embodiment of the invention the images may be processed before they are stored on a computer readable medium.

Once the images have been acquired, the process of displaying relative motion or movement is initiated. The first step of displaying relative motion in exemplary embodiments of the invention generally includes displaying a fist picture of a plurality or sequence of pictures on a screen. The user may then identify a feature(s) on the first image, wherein the identified feature will be designated the stationary feature in the process of displaying relative motion. In an exemplary embodiment of the invention, the stationary feature may be a particular vertebrae in a patient's spine. In another exemplary embodiment, the stationary feature may be a portion of a patient's joint. The stationary feature should be selected as a feature that appears in each of the plurality of images that are to be used in the process of displaying relative motion, e.g., motion between the stationary feature and surrounding features generally cannot be shown in a sequence of images without the stationary feature being shown in each of the images of the sequence.

Once the stationary feature has been selected in the first image, the process of displaying relative motion continues with the display and translation process for the second and subsequent images. More particularly, the display and translation process generally includes overlaying a second image that also contains the stationary feature therein over the first image containing the stationary future. The user may then translate the second image such that the stationary feature in the second image occupies the same position on the display screen as the stationary feature in the first image. The process of translating the second image with respect to the first image generally includes the user moving the second image in two dimensions (i.e., X and Y in the plane of the display screen) until the stationary feature in the second image occupies the same position on the display screen as the stationary feature in the first image. The translation may be conducted by switching between the respective images and comparing the position of the stationary features, or alternatively, the translation may be conducted by simultaneously displaying both images (overlaying) and translating the second image to align the stationary feature in the image with the stationary feature in the first image.

The translation process may also include resizing the first and or second image (or other images if more than two images are used in the process of the invention). Resizing the images assists the user in generating stationary features of the same size between the respective images, such the relative movement of the stationary features between the respective images may be illustrated without having to account for differences in scale between the plurality of images during the display process. Thus, embodiments of the present invention may be configured to size and/or scale various images in the image sequence so that the stationary features illustrated in the respective images are substantially the same size when displayed to the user. This scaling and/or sizing of the images (stationary features) provides for a more accurate illustration of relative movement between the stationary feature and adjacent features.

Embodiments of the invention may be further configured to adjust for varying camera angles used when capturing the images in the sequence being analyzed and displayed. For example, the exemplary method and/or system of the invention may be further configured to translate any of the captured images in a plurality of directions, angles, or planes. More particularly, in addition to translating the images in an X-Y plane of the display screen, embodiments of the invention may be further configured to zoom images (enlarge or shrink), rotate the images about an axis traveling through the image or in the plane of the image (vertical axis, horizontal axis, or any other axis that when the image is rotated about the axis allows for alignment of the stationary object in the second image with the stationary object in the first image), or move/adjust the image in any other plane, line, or direction to assist with aligning the stationary feature(s) in the respective images.

The process of adjusting the images so that the stationary features align between the respective sequence of images allows the present invention not only to display relative movement between various features illustrated in the sequence of images, but also allows embodiments of the present invention to utilize images taken from various positions. More particularly, in the situation where a first image is taken at a first position relative to the subject, and a second or subsequent image is taken at a second position relative to the subject, where the first and second positions are different, then the translation features of the present invention allow for relative movement to still be accurately display. For example, if the second image is taken from an angle that varies by 10° from the angle at which the first image is taken, then the process of translating the second image onto the first image can be used to account for the difference in acquisition angles between the images. For example, to account for the difference in acquisition angles, the second image may be rotated about an axis that lies in the plane of the image so that the second image is essentially skewed by 10°, and therefore, the stationery feature in the second image will match or line up with the stationery feature in the first image taken from a different acquisition angle.

Once the stationery features in each of the respective images of the sequence have been aligned, i.e. translated, then the method of the invention may continue to displaying the relative movement between the stationary features illustrated in the respective images. In this portion of the method, the sequence of images are generally displayed in succession to illustrate the movement between the stationery feature, which remains in a single position throughout the sequence of images, and those features adjacent to the stationery feature.

To illustrate the differences between the respective images, embodiments of the invention may color of the respective images in different colors. For example, the stationery or adjacent features in the first image may be displayed in a different color from the stationery or adjacent features in the second or subsequent images. Additionally, and at least one embodiment of the invention, of the features of more than one image may be simultaneously displayed. For example, the stationary and adjacent features of the first image may be colored white, and the adjacent features of the second image may be colored green. Then the first image may be displayed in the second image may be overlaid thereon, with both images still being displayed to the user simultaneously. Thus, the user may see the stationary and adjacent features illustrated in white (from the first image), while also seeing the adjacent features illustrated in the second image in green. This allows the user to display the stationary and adjacent features from a patient posing in a first position, while also displaying the stationary and or adjacent features on the patient posing in a second position, where the features displayed from the second position may be illustrated in a different color for the distinction. This allows practitioners to quickly and easily identify a relative movement between the stationery feature and the adjacent features.

In another embodiment of the invention, the process of scrolling through the sequence of images to illustrate the relative movement between the stationary and adjacent features may be controlled by the user. More particularly, the user may control the rate at which the images are scrolled or changed to allow time for analysis of each of their respective images. Further, embodiments of the invention may also provide a measuring scale that may be overlaid onto any of the images to measure distances between, for example, the stationary feature and an adjacent future.

Figure 16:
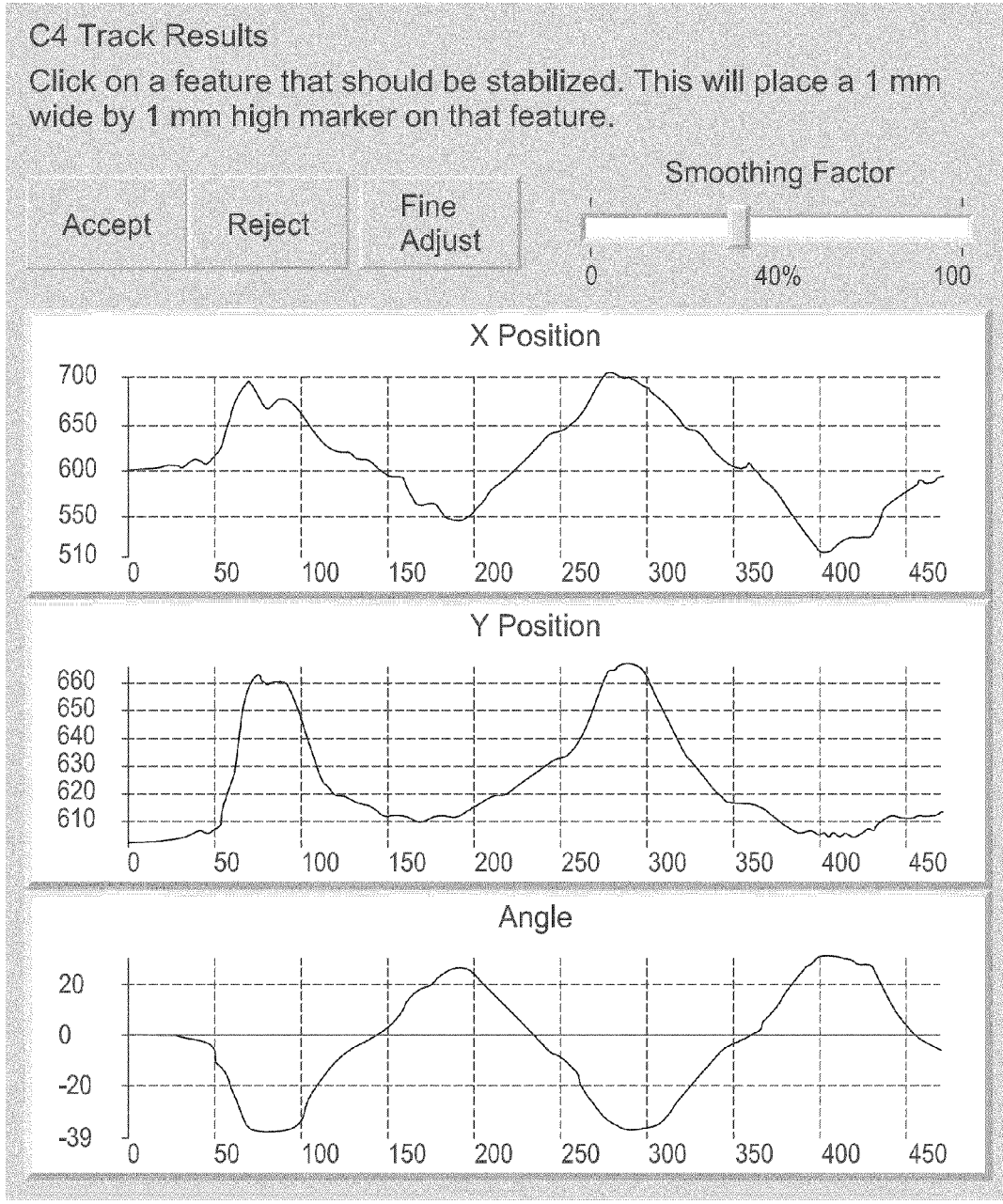
FIG. 16 is a graphical user interface view of an example of how the quantitative results of the tracking of a vertebra can be displayed to the user.

According to one embodiment, the computer system provides a means to select tracked results and to display the results in a spreadsheet format. The user is able to save and print the results or see the results displayed as line graphs (FIG. 16). The computer system also provides a means of creating clinical reports (FIG. 17). The clinical reports include pre-defined text, patient/study related text, quantitative results text, quantitative result graphs and selected images. The computer system supports site-specific report templates so that the clinical report content is customized to each clinical or research site.

The present embodiments include a method, computer program, and an information handling system for computer processing of medical images for the purposes of visualizing and measuring motion of, and between vertebrae in the spine. The present embodiments also include a report generated using the method as disclosed herein. Advantages of the computerized approach of the present embodiments over traditional techniques of visual inspection of radiographs include one or more of: 1) quantitative assessment of the relative motion between vertebrae, 2) an improved means of visualization of the relative motion between vertebrae, 3) improved visualization of non-planar patient motion, and 4) improved accuracy and reproducibility of the assessment of intervertebral motion.

The present embodiments also include computer processing of medical images via identifying specific vertebrae in the images, tracking the position of the vertebrae as it moves with respect to a specific coordinate system, using the tracking data to create a new version of a moving sequence or video wherein a specific vertebra remains still as the sequence of images is displayed, and calculating and reporting specific relative motions between vertebrae.

According to the present disclosures, computer processing of medical images for the purposes of visualizing and measuring motion of, and between vertebrae in the spine has been disclosed herein. The processing includes methods to identify specific vertebrae in the images, methods to track the position of the vertebrae as it moves with respect to a specific coordinate system, methods to use the tracking data to create a new version of the video where a specific vertebra remains still, and methods to calculate and report specific relative motions between vertebrae.

Accordingly, the present embodiments provide a reliable, objective, non-invasive method that can be used by clinicians and researchers to measure and visualize motion in the spine. According to one embodiment, the method uses images of the spine taken in two or more different positions, and further utilizes an information handling system and/or computer systems to provide measurement and visualization of motion in the spine.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A computer-implemented method for analyzing intervertebral motion of a spine, comprising:
    acquiring a first image of a spine having a plurality of vertebrae in a first position;
    acquiring a second image of the spine in a second position, wherein the first and second images are acquired from a substantially similar acquisition position;
    displaying the first and second images on a display;
    selecting at least two landmarks along a first target vertebrae of the spine displayed in the first image;
    electronically transferring the selected at least two landmarks to the second image;
    alternatingly displaying the first and second images to display relative movement of the spine between the first and second positions;
    stabilizing the first target vertebrae in the second image in a manner that aligns the first target vertebrae in the second image with the first target vertebrae in the first image such that the first target vertebrae appears stationary as the first and second images are alternatingly displayed in a manner that represents the spine moving between the first and second positions;
    displaying relative motion between the stabilized first target vertebrae and other vertebrae along the spine; and
    analyzing intervertebral motion of the spine based upon the relative motion between the first target vertebrae and the other vertebrae along the spine, wherein analyzing intervertebral motion further comprises:
        selecting at least two landmarks along a second target vertebrae of the spine displayed in the first image;
        electronically transferring the selected at least two landmarks of the second target vertebrae to the second image;
        alternately displaying the first and second images to display relative movement of the spine between the first and second positions;
        stabilizing the second target vertebrae in second image such that the second target vertebrae appears stationary as the spine moves between the first and second positions;
        displaying relative motion between the stabilized second target vertebrae and other vertebrae along the spine; and quantifying the relative motion between the first target vertebrae and the second target vertebrae.

2. A computer-implemented method as defined in claim 1, wherein the at least two landmarks are selected within only the first image.

3. A computer-implemented method as defined in claim 1, wherein a spatial relationship between the at least two landmarks of the first image is identical to a spatial relationship between the at least two landmarks of the second image.

4. A computer-implemented method as defined in claim 1, wherein stabilizing the first target vertebrae further comprises aligning the transferred at least two landmarks over the first target vertebrae in the second image.

5. A computer-implemented method as defined in claim 4, wherein aligning the transferred at least two landmarks over the first target vertebrae in the second image further comprises moving at least one of the first or second images in an X-Y plane relative to one another.

6. A computer-implemented method as defined in claim 4, wherein aligning the transferred at least two landmarks over the first target vertebrae in the second image further comprises zooming at least one of the first and second images.

7. A computer-implemented method as defined in claim 4, wherein aligning the transferred at least two landmarks over the first target vertebrae in the second image further comprises rotating at least one of the first and second images:
   about an axis traveling through the rotated image; or
   in a plane of the rotated image.

8. A computer-implemented method as defined in claim 1, further comprising displaying a translatable measuring device on the display to allow measurement of the relative motion between the first target vertebrae and the other vertebrae.

9. A computer-implemented method as defined in claim 1, wherein acquiring at least two images comprises an x-ray or magnetic resonance imaging process.

10. A computer-implemented method as defined in claim 1, wherein alternately displaying the first and second images further comprises presenting the first and second images in different colors to distinguish between the first and second images.

11. A non-transitory computer readable medium encoded with a computer program that, when executed by a processor, is configured to control a method for analyzing intervertebral motion of a spine, the method comprising:
   acquiring a first image of a spine having a plurality of vertebrae in a first position;
   acquiring a second image of the spine in a second position, wherein the first and second images are acquired from a substantially similar acquisition position;
   displaying the first and second images on a display;
   detecting selection of at least two landmarks along a first target vertebrae of the spine displayed in the first image;
   electronically transferring the selected at least two landmarks to the second image;
   alternatingly displaying the first and second images to display relative movement of the spine between the first and second positions;
   stabilizing the first target vertebrae in the second image in a manner that aligns the first target vertebrae in the second image with the first target vertebrae in the first image such that the first target vertebrae appears stationary as the first and second images are alternatingly displayed in a manner that represents the spine moving between the first and second positions; and
   displaying relative motion between the stabilized first target vertebrae and other vertebrae along the spine, wherein intervertebral motion of the spine is analyzed based upon the relative motion between the first target vertebrae and the other vertebrae along the spine, and
   wherein analyzing the intervertebral motion of the spine comprises:
      detecting selection of at least two landmarks along a second target vertebrae of the spine displayed in the first image;
      transferring the selected at least two landmarks of the second target vertebrae to the second image;
      alternately displaying the first and second images to display relative movement of the spine between the first and second positions;
      stabilizing the second target vertebrae in second image such that the second target vertebrae appears stationary as the spine moves between the first and second positions;
      displaying relative motion between the stabilized second target vertebrae and other vertebrae along the spine; and
      quantifying the relative motion between the first target vertebrae and the second target vertebrae.

12. A non-transitory computer readable medium as defined in claim 11, wherein the at least two landmarks are selected within only the first image.

13. A non-transitory computer readable medium as defined in claim 11, wherein a spatial relationship between the at least two landmarks of the first image is identical to a spatial relationship between the at least two landmarks of the second image.

14. A non-transitory computer readable medium as defined in claim 11, wherein stabilizing the first target vertebrae further comprises aligning the transferred at least two landmarks over the first target vertebrae in the second image.

15. A non-transitory computer readable medium as defined in claim 14, wherein aligning the transferred at least two landmarks over the first target vertebrae in the second image further comprises moving at least one of the first or second images in an X-Y plane relative to one another.

16. A non-transitory computer readable medium as defined in claim 14, wherein aligning the transferred at least two landmarks over the first target vertebrae in the second image further comprises zooming at least one of the first and second images.

17. A non-transitory computer readable medium as defined in claim 14, wherein aligning the transferred at least two landmarks over the first target vertebrae in the second image further comprises rotating at least one of the first and second images:
   about an axis traveling through the rotated image; or
   in a plane of the rotated image.

18. A non-transitory computer readable medium as defined in claim 11, further comprising displaying a translatable measuring device on the display to allow measurement of the relative motion between the first target vertebrae and the other vertebrae.

19. A non-transitory computer readable medium as defined in claim 11, wherein acquiring at least two images comprises an x-ray or magnetic resonance imaging process.

20. A non-transitory computer readable medium as defined in claim 11, wherein alternately displaying the first and second images further comprises presenting the first and second images in different colors to distinguish between the first and second images.

21. A computer-implemented method for analyzing intervertebral motion of a spine, comprising:

acquiring a first image of a spine having a plurality of vertebrae in a first position;

acquiring a second image of the spine in a second position, wherein the first and second images are acquired from a substantially similar acquisition position;

displaying the first and second images on a display;

selecting at least two landmarks along a first target vertebrae of the spine displayed in the first image;

electronically transferring the selected at least two landmarks to the second image;

alternatingly displaying the first and second images to display relative movement of the spine between the first and second positions;

stabilizing the first target vertebrae in the second image in a manner that aligns the first target vertebrae in the second image with the first target vertebrae in the first image such that the first target vertebrae appears stationary as the first and second images are alternatingly displayed in a manner that represents the spine moving between the first and second positions;

displaying relative motion between the stabilized first target vertebrae and other vertebrae along the spine; and analyzing intervertebral motion of the spine based upon the relative motion between the first target vertebrae and the other vertebrae along the spine, wherein analyzing intervertebral motion of the spine further comprises:

stabilizing a second target vertebrae in second image such that the second target vertebrae appears stationary as the spine moves between the first and second positions;

displaying relative motion between the stabilized second target vertebrae and other vertebrae along the spine; and quantifying relative motion between the first target vertebrae and the second target vertebrae.

22. A computer-implemented method as defined in claim 21, wherein the at least two landmarks are selected within only the first image.

23. A computer-implemented method as defined in claim 21, wherein a spatial relationship between the at least two landmarks of the first image is identical to a spatial relationship between the at least two landmarks of the second image.

24. A computer-implemented method as defined in claim 21, wherein stabilizing the first target vertebrae further comprises aligning the transferred at least two landmarks over the first target vertebrae in the second image.

25. A computer-implemented method as defined in claim 24, wherein aligning the transferred at least two landmarks over the first target vertebrae in the second image further comprises moving at least one of the first or second images in an X-Y plane relative to one another.

26. A computer-implemented method as defined in claim 24, wherein aligning the transferred at least two landmarks over the first target vertebrae in the second image further comprises zooming at least one of the first and second images.

27. A computer-implemented method as defined in claim 24, wherein aligning the transferred at least two landmarks over the first target vertebrae in the second image further comprises rotating at least one of the first and second images:
about an axis traveling through the rotated image; or
in a plane of the rotated image.

28. A computer-implemented method as defined in claim 21, further comprising displaying a translatable measuring device on the display to allow measurement of the relative motion between the first target vertebrae and the other vertebrae.

29. A computer-implemented method as defined in claim 21, wherein acquiring at least two images comprises an x-ray or magnetic resonance imaging process.

30. A computer-implemented method as defined in claim 21, wherein alternately displaying the first and second images further comprises presenting the first and second images in different colors to distinguish between the first and second images.

31. A non-transitory computer readable medium encoded with a computer program that, when executed by a processor, is configured to control a method for analyzing intervertebral motion of a spine, the method comprising:

acquiring a first image of a spine having a plurality of vertebrae in a first position;

acquiring a second image of the spine in a second position, wherein the first and second images are acquired from a substantially similar acquisition position;

displaying the first and second images on a display;

detecting selection of at least two landmarks along a first target vertebrae of the spine displayed in the first image;

electronically transferring the selected at least two landmarks to the second image;

alternatingly displaying the first and second images to display relative movement of the spine between the first and second positions;

stabilizing the first target vertebrae in the second image in a manner that aligns the first target vertebrae in the second image with the first target vertebrae in the first image such that the first target vertebrae appears stationary as the first and second images are alternatingly displayed in a manner that represents the spine moving between the first and second positions; and displaying relative motion between the stabilized first target vertebrae and other vertebrae along the spine, wherein intervertebral motion of the spine is analyzed based upon the relative motion between the first target vertebrae and the other vertebrae along the spine, and wherein analyzing the intervertebral motion of the spine comprises:

stabilizing a second target vertebrae in second image such that the second target vertebrae appears stationary as the spine moves between the first and second positions;

displaying relative motion between the stabilized second target vertebrae and other vertebrae along the spine; and quantifying relative motion between the first target vertebrae and the second target vertebrae.

32. A non-transitory computer readable medium as defined in claim 31, wherein the at least two landmarks are selected within only the first image.

33. A non-transitory computer readable medium as defined in claim 31, wherein a spatial relationship between the at least two landmarks of the first image is identical to a spatial relationship between the at least two landmarks of the second image.

34. A non-transitory computer readable medium as defined in claim 31, wherein stabilizing the first target vertebrae further comprises aligning the transferred at least two landmarks over the first target vertebrae in the second image.

35. A non-transitory computer readable medium as defined in claim 34, wherein aligning the transferred at least two landmarks over the first target vertebrae in the second image further comprises moving at least one of the first or second images in an X-Y plane relative to one another.

36. A non-transitory computer readable medium as defined in claim 34, wherein aligning the transferred at least two landmarks over the first target vertebrae in the second image further comprises zooming at least one of the first and second images.

37. A non-transitory computer readable medium as defined in claim 34, wherein aligning the transferred at least two landmarks over the first target vertebrae in the second image further comprises rotating at least one of the first and second images:
   about an axis traveling through the rotated image; or
   in a plane of the rotated image.

38. A non-transitory computer readable medium as defined in claim 31, further comprising displaying a translatable measuring device on the display to allow measurement of the relative motion between the first target vertebrae and the other vertebrae.

39. A non-transitory computer readable medium as defined in claim 31, wherein acquiring at least two images comprises an x-ray or magnetic resonance imaging process.

40. A non-transitory computer readable medium as defined in claim 31, wherein alternately displaying the first and second images further comprises presenting the first and second images in different colors to distinguish between the first and second images.

* * * * *